US012592881B2

(12) United States Patent
Gill et al.

(10) Patent No.: US 12,592,881 B2
(45) Date of Patent: Mar. 31, 2026

(54) SCALING EFFICIENCY FOR INTERNAL TRANSPORT SERVICES IN DISTRIBUTED NETWORK ELEMENTS

(71) Applicant: Cisco Technology, Inc., San Jose, CA (US)

(72) Inventors: Ajeet Pal Singh Gill, Fremont, CA (US); Manish Mehra, Los Altos, CA (US)

(73) Assignee: Cisco Technology, Inc., San Jose, CA (US)

( * ) Notice: Subject to any disclaimer, the term of this patent is extended or adjusted under 35 U.S.C. 154(b) by 274 days.

(21) Appl. No.: 18/416,989

(22) Filed: Jan. 19, 2024

(65) Prior Publication Data

US 2025/0240236 A1     Jul. 24, 2025

(51) Int. Cl.
*H04L 45/00* (2022.01)
*H04L 45/44* (2022.01)
*H04L 45/745* (2022.01)

(52) U.S. Cl.
CPC .............. *H04L 45/34* (2013.01); *H04L 45/44* (2013.01); *H04L 45/745* (2013.01)

(58) Field of Classification Search
None
See application file for complete search history.

(56) References Cited

U.S. PATENT DOCUMENTS

| | | | |
|---|---|---|---|
| 10,454,823 B1 | 10/2019 | Thomas et al. | |
| 11,336,515 B1 * | 5/2022 | Mehta ..................... | H04L 69/22 |

| | | | |
|---|---|---|---|
| 2016/0127321 A1 | 5/2016 | Fainkichen et al. | |
| 2016/0344687 A1 * | 11/2016 | Rong ................... | H04L 12/4641 |
| 2019/0306109 A1 * | 10/2019 | Masputra ................ | G06F 9/544 |
| 2020/0014634 A1 * | 1/2020 | Asghar ................ | H04L 12/462 |
| 2020/0014636 A1 * | 1/2020 | Vallepalli ................ | H04L 47/20 |
| 2020/0127971 A1 | 4/2020 | Saxena | |
| 2021/0218750 A1 | 7/2021 | Wells | |
| 2022/0038311 A1 * | 2/2022 | Shen ................... | H04L 63/0263 |
| 2022/0321471 A1 | 10/2022 | Deb et al. | |
| 2023/0014835 A1 | 1/2023 | Ravi et al. | |
| 2023/0066013 A1 | 3/2023 | Ball | |

OTHER PUBLICATIONS

International Search Report and Written Opinion for International Application No. PCT/US2025/011421, mailed Apr. 4, 2025, 10 Pages.

* cited by examiner

*Primary Examiner* — Quang N Nguyen
(74) *Attorney, Agent, or Firm* — Polsinelli P.C.

(57) ABSTRACT

A system and associated methods outlined herein are directed to improving scaling efficiency for routing devices that service multiple applications through multiple socket interfaces and multiple network segments. In particular, the system aims to reduce memory overhead associated with current methods of network segmentation in Network Stack Instances of a network device by establishing a single namespace that services multiple network segments instead of establishing multiple namespaces where each namespace serves an individual network segment. The system also includes an intercept layer that ensures compatibility with third-party applications that would otherwise expect individual namespaces.

20 Claims, 16 Drawing Sheets

NETWORK DEVICE 500

FORWARDING PLANE 540

CONTROL PLANE 530

APPS 532

MANAGEMENT PLANE 520

NETWORK STACK INSTANCE 550 (e.g., kernel)

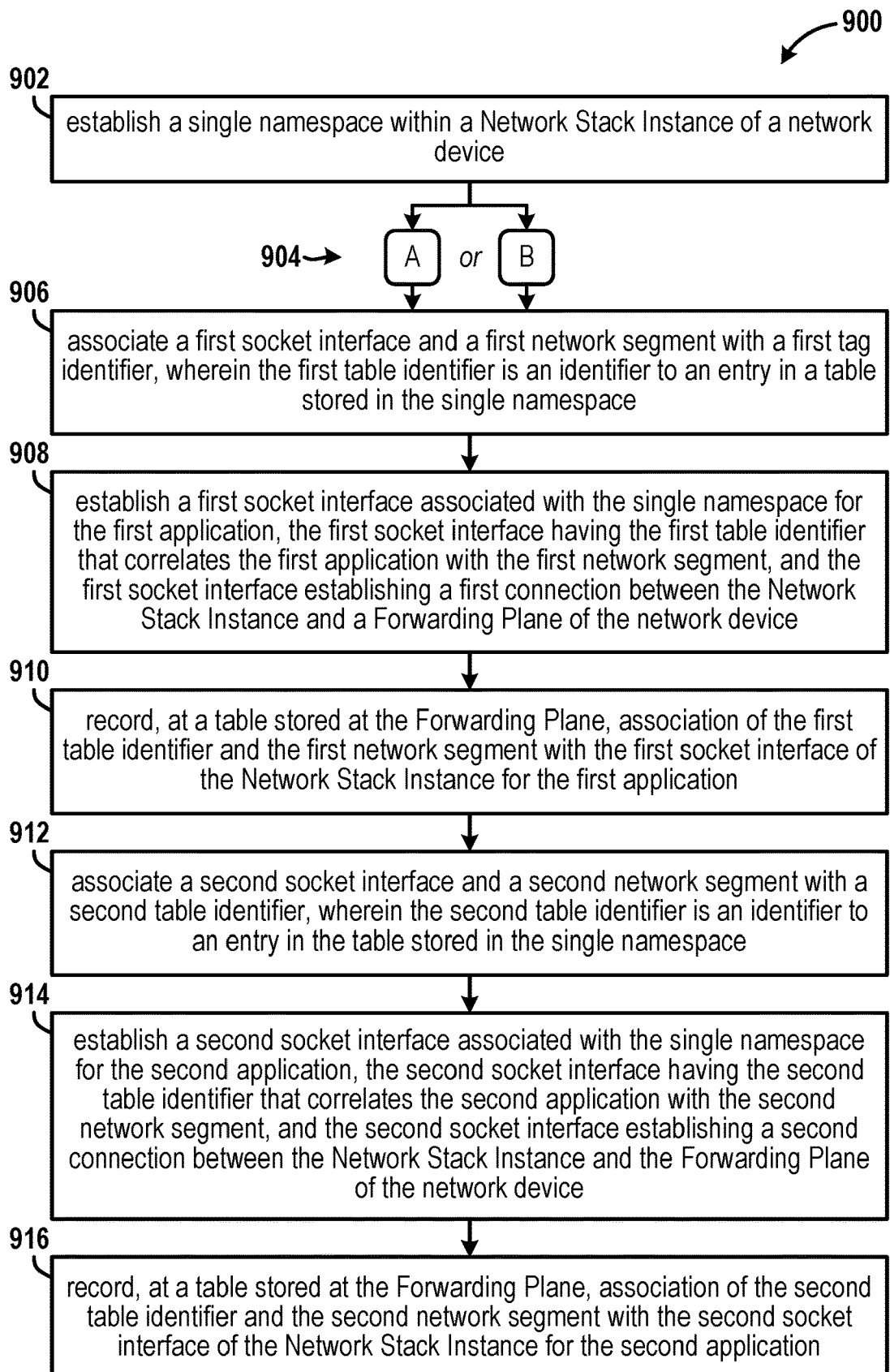

900

902
establish a single namespace within a Network Stack Instance of a network device 904→  A  or  B 906
associate a first socket interface and a first network segment with a first tag identifier, wherein the first table identifier is an identifier to an entry in a table stored in the single namespace 908
establish a first socket interface associated with the single namespace for the first application, the first socket interface having the first table identifier that correlates the first application with the first network segment, and the first socket interface establishing a first connection between the Network Stack Instance and a Forwarding Plane of the network device 910
record, at a table stored at the Forwarding Plane, association of the first table identifier and the first network segment with the first socket interface of the Network Stack Instance for the first application 912
associate a second socket interface and a second network segment with a second table identifier, wherein the second table identifier is an identifier to an entry in the table stored in the single namespace 914
establish a second socket interface associated with the single namespace for the second application, the second socket interface having the second table identifier that correlates the second application with the second network segment, and the second socket interface establishing a second connection between the Network Stack Instance and the Forwarding Plane of the network device 916
record, at a table stored at the Forwarding Plane, association of the second table identifier and the second network segment with the second socket interface of the Network Stack Instance for the second application

FIG. 9A

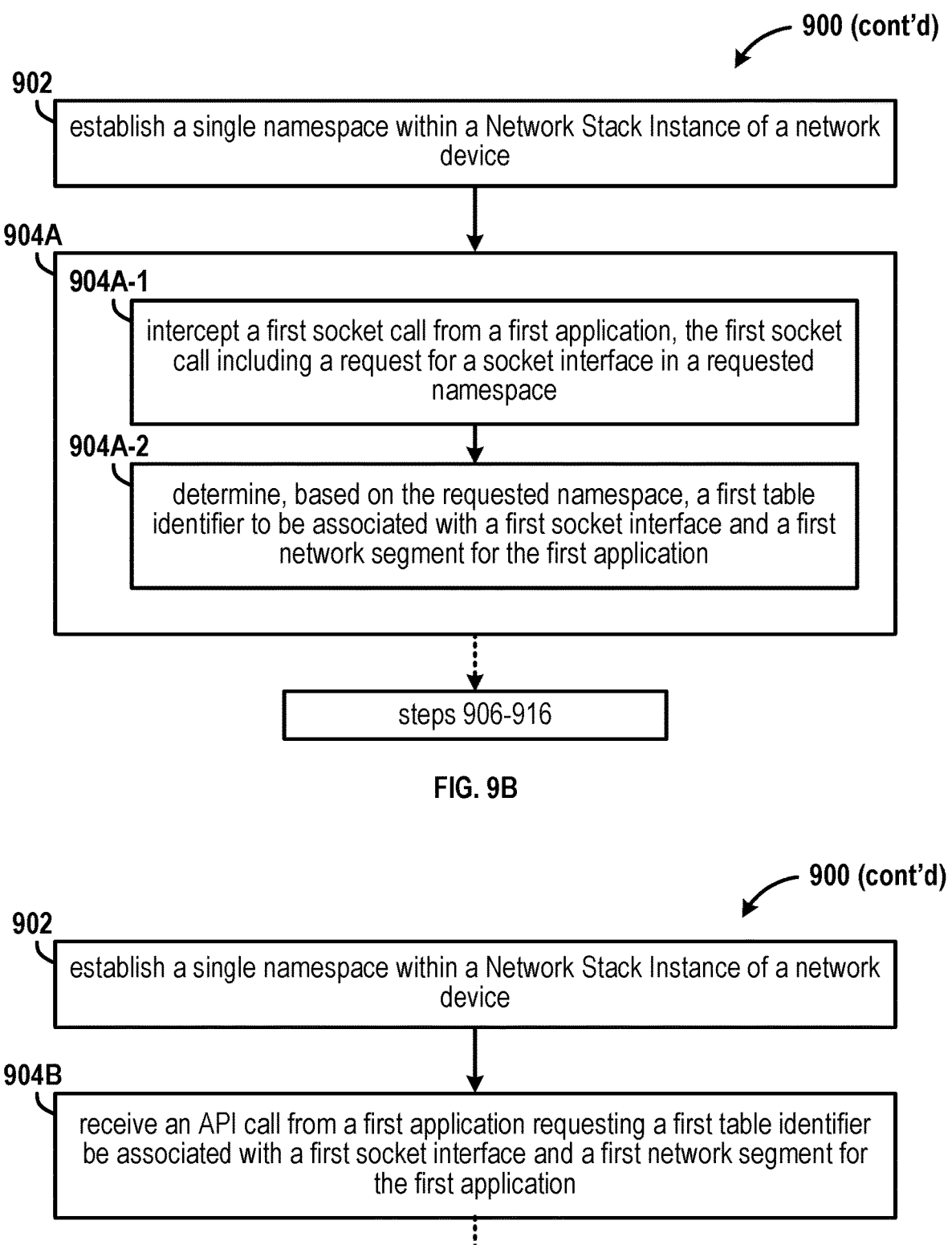

900 (cont'd)

902 establish a single namespace within a Network Stack Instance of a network device

904A

904A-1 intercept a first socket call from a first application, the first socket call including a request for a socket interface in a requested namespace

904A-2 determine, based on the requested namespace, a first table identifier to be associated with a first socket interface and a first network segment for the first application steps 906-916

FIG. 9B 900 (cont'd)

902 establish a single namespace within a Network Stack Instance of a network device

904B receive an API call from a first application requesting a first table identifier be associated with a first socket interface and a first network segment for the first application steps 906-916

FIG. 9C

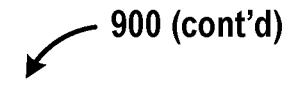

900 (cont'd)

```
                    ┌─────────────────────────────┐
                    │        steps 902-910        │
                    └─────────────────────────────┘
                                 ⋮
```

918
receive a first outgoing packet from the first application at the Network Stack Instance, the first outgoing packet designating the first socket interface 920
append the first table identifier to the first outgoing packet 922
send the first outgoing packet to the Forwarding Plane through the first socket interface 924
access, at the Forwarding Plane, the first table identifier of the first outgoing packet 926
identify the first network segment based on the first table identifier of the first outgoing packet 928
forward the first outgoing packet to a destination device over the first network segment

FIG. 9D 900 (cont'd)

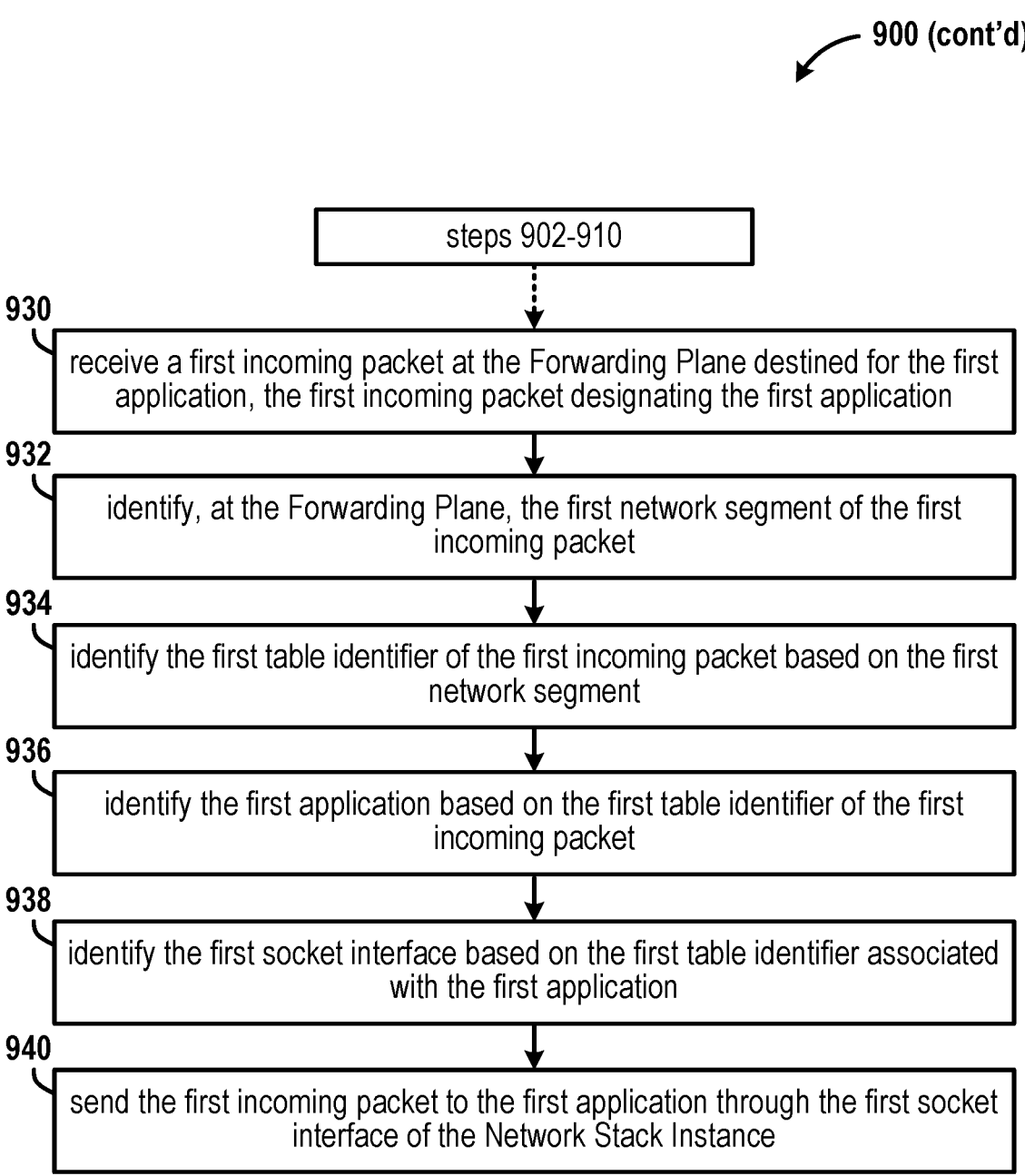

steps 902-910

930
receive a first incoming packet at the Forwarding Plane destined for the first application, the first incoming packet designating the first application 932
identify, at the Forwarding Plane, the first network segment of the first incoming packet 934
identify the first table identifier of the first incoming packet based on the first network segment 936
identify the first application based on the first table identifier of the first incoming packet 938
identify the first socket interface based on the first table identifier associated with the first application 940
send the first incoming packet to the first application through the first socket interface of the Network Stack Instance

FIG. 9E

SCALING EFFICIENCY FOR INTERNAL TRANSPORT SERVICES IN DISTRIBUTED NETWORK ELEMENTS

BACKGROUND

Network elements such as SDWAN cEdge routers use a distributed architecture for control plane and data plane. Most of the control plane functionality is implemented on a 'Routing Plane (RP) complex' and data plane functionality is implemented on a 'Forwarding Plane (FP) complex'. Currently, the Routing Plane complex maintains multiple namespaces to handle flows from different applications in highly segmented networks. This arrangement requires the Routing Plane complex to allocate significant amounts of memory for each respective namespace, much of which is redundant with information that is maintained by the Forwarding Plane complex.

BRIEF DESCRIPTION OF THE SEVERAL VIEWS OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which:

FIGS. 9A-9E illustrate a process flow outlining aspects of the method of FIG. 7 in accordance with some aspects of the present technology.

DESCRIPTION OF EXAMPLE EMBODIMENTS

Figure 1:
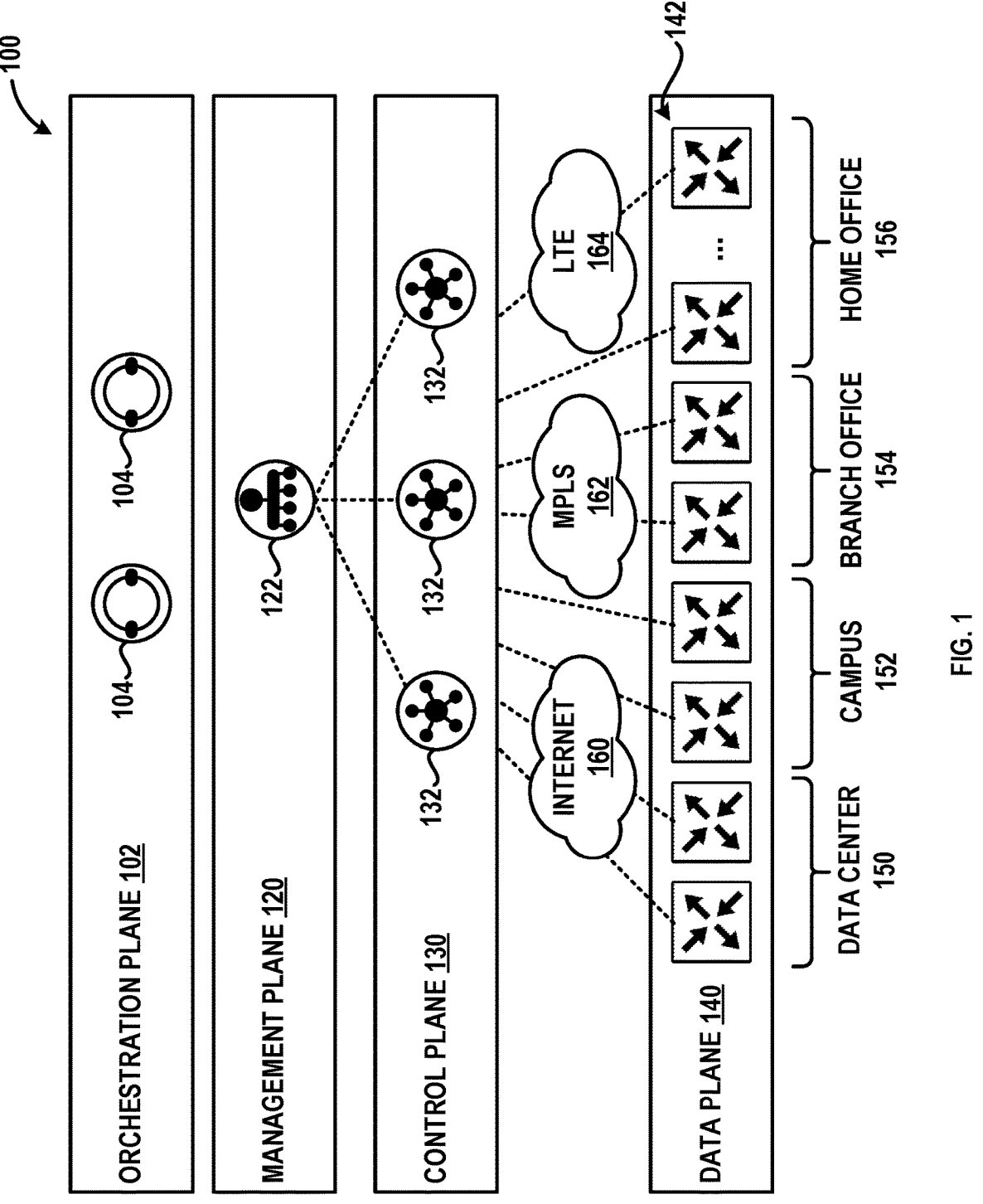
FIG. 1 illustrates an example of a high-level network architecture in accordance with some aspects of the present technology.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

Overview

Network elements such as SDWAN cEdge routers use a distributed architecture for control plane and data plane. Most of the control plane functionality is implemented on a 'Routing Plane (RP) complex' and data plane functionality is implemented on a 'Forwarding Plane (FP) complex'. Currently, the Routing Plane complex maintains multiple namespaces to handle flows from different applications in highly segmented networks. This arrangement requires the Routing Plane complex to allocate significant amounts of memory for each respective namespace, much of which is redundant with information that is maintained by the Forwarding Plane complex.

Techniques described herein improve scaling efficiency for routing devices that service multiple applications through multiple socket interfaces and multiple network segments. In particular, the system aims to reduce memory overhead associated with current methods of network segmentation in Network Stack Instances of a network device by establishing a single namespace that services multiple network segments instead of establishing multiple namespaces where each namespace serves an individual network segment. The system also includes an intercept layer that ensures compatibility with third-party applications that would otherwise expect individual namespaces.

In one aspect, a system for improving scaling efficiency for routing devices that service multiple applications through multiple socket interfaces and multiple network segments includes a network device including a processor in communication with a memory, the memory including instructions executable by the processor to: establish a single namespace within a Network Stack Instance of the network device; associate a first socket interface and a first network segment for a first application with a first table identifier, wherein the first table identifier is an identifier to an entry in a table stored in the single namespace; establish the first socket interface associated with the single namespace for the first application, the first socket interface having the first table identifier that correlates the first application with the first network segment, and the first socket interface establishing a first connection between the Network Stack Instance and a Forwarding Plane of the network device; associate a second socket interface and a second network segment for a second application with a second table identifier, wherein the second table identifier is an identifier to an entry in the table stored in the single namespace; and establish the second socket interface associated with the single namespace for the second application, the second socket interface having the second table identifier that correlates the second application with the second network segment, and the second socket interface establishing a second connection between the Network Stack Instance and the Forwarding Plane of the network device.

For associating the first (or second) socket interface and the first (or second) network segment for the first (or second)

application with the first (or second) table identifier, there may be two options. For third-party applications or other applications that would otherwise expect a unique namespace, the memory can include instructions executable by the processor to: intercept a first (or second) socket call from the first (or second) application, the first (or second) socket call including a request for a socket interface in a requested namespace; and determine, based on the requested namespace, the first (or second) table identifier to be associated with the first (or second) socket interface and the first (or second) network segment for the first (or second) application. Alternatively, the memory can include instructions executable by the processor to: receive an API call from the first (or second) application requesting the first (or second) table identifier be associated with the first (or second) socket interface and the first (or second) network segment for the first (or second) application.

Further, the memory can include instructions executable by the processor to: record, at a table stored at the Forwarding Plane, association of the first table identifier and the first network segment with the first socket interface of the Network Stack Instance for the first application. Likewise, the memory can include instructions executable by the processor to: record, at a table stored at the Forwarding Plane, association of the second table identifier and the second network segment with the second socket interface of the Network Stack Instance for the second application.

The memory can further include instructions executable by the processor to: receive a first outgoing packet from the first application at the Network Stack Instance, the first outgoing packet designating the first socket interface; append the first table identifier to the first outgoing packet; and send the first outgoing packet to the Forwarding Plane through the first socket interface. Further, the memory can include instructions executable by the processor to: access, at the Forwarding Plane, the first table identifier of the first outgoing packet; identify the first network segment based on the first table identifier of the first outgoing packet; and forward the first outgoing packet to a destination device over the first network segment.

Likewise, the memory can further include instructions executable by the processor to: receive a second outgoing packet from the second application at the Network Stack Instance, the second outgoing packet designating the second socket interface; append the second table identifier to the second outgoing packet; and send the second outgoing packet to the Forwarding Plane through the second socket interface. Further, the memory can include instructions executable by the processor to: access, at the Forwarding Plane, the second table identifier of the second outgoing packet; identify the second network segment based on the second table identifier of the second outgoing packet; and forward the second outgoing packet to a destination device over the second network segment.

The memory can further include instructions executable by the processor to: receive a first incoming packet at the Forwarding Plane destined for the first application, the first incoming packet designating the first application; identify the first socket interface based on the first table identifier associated with the first application; and send the first incoming packet to the first application through the first socket interface of the Network Stack Instance. Further, the memory can include instructions executable by the processor to: identify, at the Forwarding Plane, the first network segment of the first incoming packet; identify the first table identifier of the first incoming packet based on the first network segment; identify the first table identifier of the first incoming packet; and identify the first application based on the first table identifier of the first incoming packet.

Likewise, the memory can further include instructions executable by the processor to: receive a second incoming packet at the Forwarding Plane destined for the second application, the second incoming packet designating the second application; identify the second socket interface based on the second table identifier associated with the second application; and send the second incoming packet to the second application through the second socket interface of the Network Stack Instance. Further, the memory can include instructions executable by the processor to: identify, at the Forwarding Plane, the second network segment of the second incoming packet; identify the second table identifier of the second incoming packet based on the second network segment; identify the second table identifier of the second incoming packet; and identify the second application based on the second table identifier of the second incoming packet.

In another aspect, a method for improving scaling efficiency for routing devices that service multiple applications through multiple socket interfaces and multiple network segments includes: establishing a single namespace within a Network Stack Instance of a network device; associating a first socket interface and a first network segment for a first application with a first table identifier, wherein the first table identifier is an identifier to an entry in a table stored in the single namespace; establishing the first socket interface associated with the single namespace for the first application, the first socket interface having the first table identifier that correlates the first application with the first network segment, and the first socket interface establishing a first connection between the Network Stack Instance and a Forwarding Plane of the network device; associating a second socket interface and a second network segment for a second application with a second table identifier, wherein the second table identifier is an identifier to an entry in the table stored in the single namespace; and establishing the second socket interface associated with the single namespace for the second application, the second socket interface having the second table identifier that correlates the second application with the second network segment, and the second socket interface establishing a second connection between the Network Stack Instance and the Forwarding Plane of the network device.

In another aspect, one or more non-transitory computer-readable media includes computer-readable instructions are executable by one or more processors of a network device to perform a method for establishing a socket interface between an application and a network segment at a network stack instance includes: establishing a single namespace within a Network Stack Instance of a network device; associating a first socket interface and a first network segment for a first application with a first table identifier, wherein the first table identifier is an identifier to an entry in a table stored in the single namespace; establishing the first socket interface associated with the single namespace for the first application, the first socket interface having the first table identifier that correlates the first application with the first network segment, and the first socket interface establishing a first connection between the Network Stack Instance and a Forwarding Plane of the network device; associating a second socket interface and a second network segment for a second application with a second table identifier, wherein the second table identifier is an identifier to an entry in the table stored in the single namespace; and establishing the second socket interface associated with the single namespace for the second application, the second socket interface having the second table identifier that correlates the second application with the second network segment, and the second socket interface establishing a second connection between the Network Stack Instance and the Forwarding Plane of the network device. The method can further include: recording, at a table stored at the Forwarding Plane, association of the first table identifier and the first network segment with the first socket interface of the Network Stack Instance for the first application; and recording, at the table stored at the Forwarding Plane, association of the second table identifier and the second network segment with the second socket interface of the Network Stack Instance for the second application.

EXAMPLE EMBODIMENTS

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

The disclosed technology addresses the need in the art for methods to improve scaling efficiency for routing devices that service multiple applications through multiple socket interfaces.

In particular, the system aims to reduce memory overhead associated with current methods of network segmentation in Network Stack Instances of a network device. In previous methods, more than one namespace (e.g., Namespace-1 . . . Namespace-M) are usually implemented in a network stack instance that services different applications. An application can send a socket call to the network stack instance to open a socket (e.g., SKT-1) in a particular namespace which may or may not be specified by the application. In these implementations, the network stack instance will usually open a dedicated namespace (e.g., Namespace-1) for the application (or group of applications belonging to the same software container). As such, at a given time the network stack instance will likely have multiple namespaces open that each service various applications. Each namespace may be associated with a different network segment (e.g., VPN). The problem with such implementation is that the network isolation overhead is often very high, particularly with regards to memory. In one example, around 1.1 MB of memory is required for each network namespace, and in order to support 1000 VPNs on such a device, around 1.1 GB memory would be needed at the Routing Plane complex in addition to memory required for other features on the RP. This causes significant loss and redundancies in products/ solutions where most of the network forwarding segmentation is already implemented at the Forwarding Plane. Further, the amount of memory required to support network segmentation significantly increases the cost of the device.

As such, the systems and methods outlined herein aim to reduce memory overhead associated with current methods of network segmentation in Network Stack Instances of a network device by establishing a single namespace that services multiple network segments instead of establishing multiple namespaces where each namespace serves an individual network segment. The system also includes an intercept layer that ensures compatibility with third-party applications that would otherwise expect individual namespaces.

Computer Network Overview

A computer network is a geographically distributed collection of nodes interconnected by communication links and segments for transporting data between end nodes, such as personal computers and workstations, or other network devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other.

Since management of interconnected computer networks can prove burdensome, smaller groups of computer networks may be maintained as routing domains or autonomous systems. An autonomous system is a network or group of networks under common administration and with common routing policies. A typical example of an autonomous system is a network administered and maintained by an Internet Service Provider (ISP). Customer networks, such as universities or corporations, connect to the ISP, and the ISP routes the network traffic originating from the customer networks to network destinations that may be in the same ISP or may be reachable only through other ISPs.

To facilitate the routing of network traffic through one or more autonomous systems, the network elements of the autonomous systems need to exchange routing information to various network destinations. Border Gateway Protocol (BGP) is an Exterior Gateway Protocol (EGP) that is used to exchange routing information among network elements (e.g., routers) in the same or different autonomous systems. A computer host that executes a BGP process is typically referred to as a BGP host or a BGP network device. To exchange BGP routing information, two BGP hosts, or peers, first establish a transport protocol connection with one another. Initially, the BGP peers exchange messages to open a BGP session, and, after the BGP session is open, the BGP peers exchange their entire routing information. Thereafter, only updates or changes to the routing information are exchanged, or advertised, between the BGP peers. The exchanged routing information is maintained by the BGP peers during the existence of the BGP session.

The networks within an autonomous system are typically coupled together by conventional "intradomain" routers configured to execute intradomain routing protocols, and are generally subject to a common authority. To improve routing scalability, a service provider (e.g., an ISP) may divide an autonomous system into multiple "areas" or "levels." It may be desirable, however, to increase the number of nodes capable of exchanging data; in this case, interdomain routers executing interdomain routing protocols are used to interconnect nodes of the various autonomous systems. Moreover, it may be desirable to interconnect various autonomous systems that operate under different administrative domains. As used herein, an autonomous system, area, or level is generally referred to as a "domain."

FIG. 1 illustrates an example of a network architecture 100 for implementing aspects of the present technology. An example of an implementation of the network architecture 100 is the Cisco® SD-WAN architecture. However, one of ordinary skill in the art will understand that, for the network architecture 100 and any other system discussed in the present disclosure, there can be additional or fewer components in similar or alternative configurations. The illustrations and examples provided in the present disclosure are for conciseness and clarity. Other embodiments may include different numbers and/or types of elements but one of ordinary skill the art will appreciate that such variations do not depart from the scope of the present disclosure.

In this example, the network architecture 100 can comprise an orchestration plane 102, a management plane 120, a control plane 130, and a data plane 140. The orchestration plane can 102 assist in the automatic on-boarding of edge network devices 142 (e.g., switches, routers, etc.) in an overlay network. The orchestration plane 102 can include one or more physical or virtual network orchestrator appliances 104. The network orchestrator appliance(s) 104 can perform the initial authentication of the edge network devices 142 and orchestrate connectivity between devices of the control plane 130 and the data plane 140. In some embodiments, the network orchestrator appliance(s) 104 can also enable communication of devices located behind Network Address Translation (NAT). In some embodiments, physical or virtual Cisco® SD-WAN vBond appliances can operate as the network orchestrator appliance(s) 104.

The management plane 120 can be responsible for the central configuration and monitoring of a network. The management plane 120 can include one or more physical or virtual network management appliances 122. In some embodiments, the network management appliance(s) 122 can provide centralized management of the network via a graphical user interface to enable a user to monitor, configure, and maintain the edge network devices 142 and links (e.g., Internet transport network 160, Multiprotocol Label Switching (MPLS) network 162, 4G/LTE network 164) in an underlay and overlay network. The network management appliance(s) 122 can support multi-tenancy and enable centralized management of logically isolated networks associated with different entities (e.g., enterprises, divisions within enterprises, groups within divisions, etc.). Alternatively or in addition, the network management appliance(s) 122 can be a dedicated network management system for a single entity. In some embodiments, physical or virtual Cisco® SD-WAN vManage appliances can operate as the network management appliance(s) 122.

The control plane 130 can build and maintain a network topology and make decisions on where traffic flows. The control plane 130 can include one or more physical or virtual network controller appliance(s) 132. The network controller appliance(s) 132 can establish secure connections to each network device 142 and distribute route and policy information via a control plane protocol (e.g., Overlay Management Protocol (OMP) (discussed in further detail below), Open Shortest Path First (OSPF), Intermediate System to Intermediate System (IS-IS), Border Gateway Protocol (BGP), Protocol-Independent Multicast (PIM), Internet Group Management Protocol (IGMP), Internet Control Message Protocol (ICMP), Address Resolution Protocol (ARP), Bidirectional Forwarding Detection (BFD), Link Aggregation Control Protocol (LACP), etc.). In some embodiments, the network controller appliance(s) 132 can operate as route reflectors. The network controller appliance(s) 132 can also orchestrate secure connectivity in the data plane 140 between and among the edge network devices 142. For example, in some embodiments, the network controller appliance(s) 132 can distribute crypto key information among the network device(s) 142. This can allow the network to support a secure network protocol or application (e.g., Internet Protocol Security (IPSec), Transport Layer Security (TLS), Secure Shell (SSH), etc.) without Internet Key Exchange (IKE) and enable scalability of the network. In some embodiments, physical or virtual Cisco® SD-WAN vSmart controllers can operate as the network controller appliance(s) 132.

The data plane 140 can be responsible for forwarding packets based on decisions from the control plane 130. The data plane 140 can include the edge network devices 142, which can be physical or virtual network devices. The edge network devices 142 can operate at the edges various network environments of an organization, such as in one or more data centers or colocation centers 150, campus networks 152, branch office networks 154, home office networks 156, and so forth, or in the cloud (e.g., Infrastructure as a Service (IaaS), Platform as a Service (PaaS), SaaS, and other cloud service provider networks). The edge network devices 142 can provide secure data plane connectivity among sites over one or more WAN transports, such as via one or more Internet transport networks 160 (e.g., Digital Subscriber Line (DSL), cable, etc.), MPLS networks 162 (or other private packet-switched network (e.g., Metro Ethernet, Frame Relay, Asynchronous Transfer Mode (ATM), etc.), mobile networks 164 (e.g., 3G, 4G/LTE, 5G, etc.), or other WAN technology (e.g., Synchronous Optical Networking (SONET), Synchronous Digital Hierarchy (SDH), Dense Wavelength Division Multiplexing (DWDM), or other fiber-optic technology; leased lines (e.g., T1/E1, T3/E3, etc.); Public Switched Telephone Network (PSTN), Integrated Services Digital Network (ISDN), or other private circuit-switched network; small aperture terminal (VSAT) or other satellite network; etc.). The edge network devices 142 can be responsible for traffic forwarding, security, encryption, quality of service (QoS), and routing (e.g., BGP, OSPF, etc.), among other tasks. In some embodiments, physical or virtual Cisco® SD-WAN vEdge routers can operate as the edge network devices 142.

Figure 2:
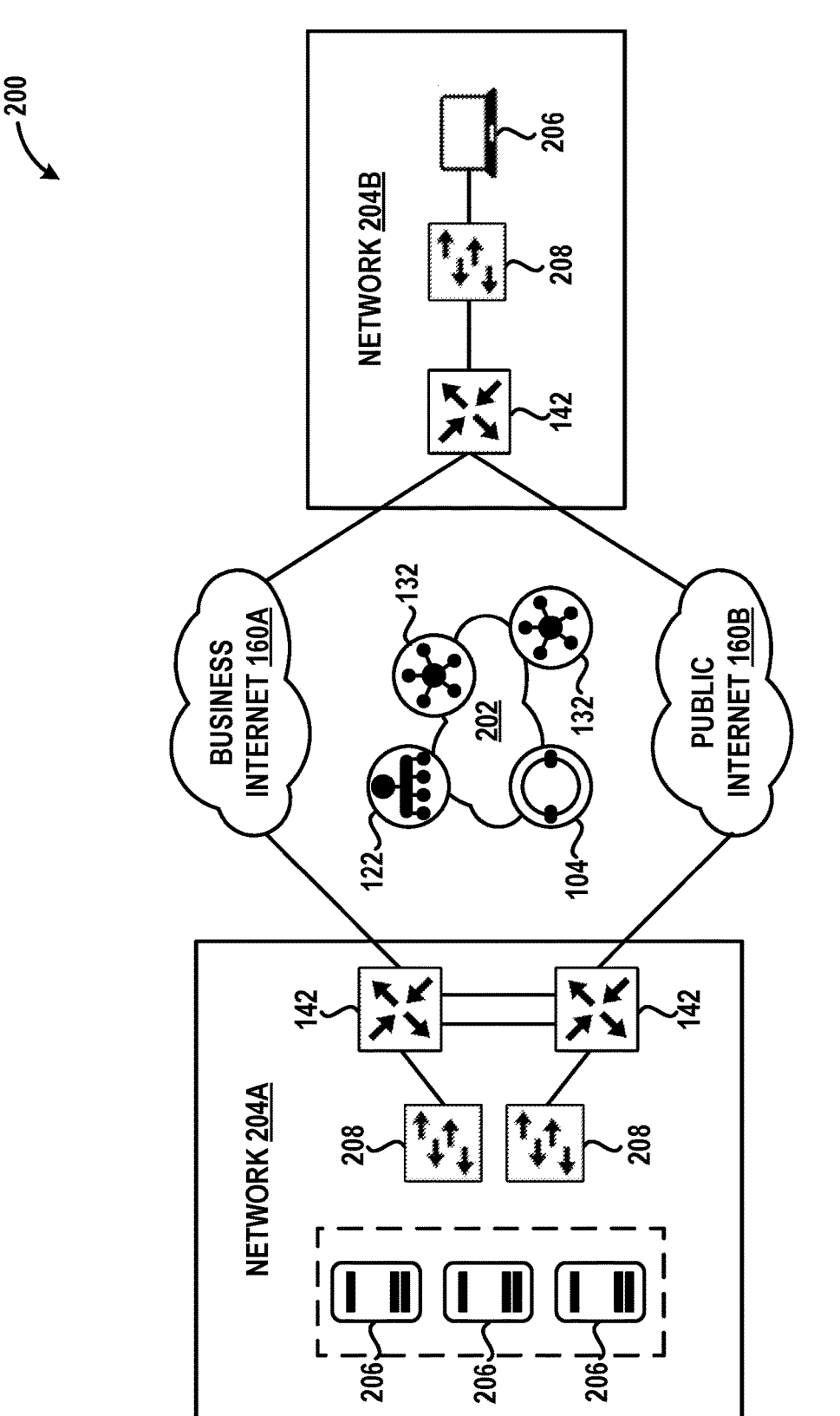
FIG. 2 illustrates an example of a network topology in accordance with some aspects of the present technology.

FIG. 2 illustrates an example of a network topology 200 for showing various aspects of the network architecture 100. The network topology 200 can include a management network 202, a pair of network sites 204A and 204B (collectively, 204) (e.g., the data center(s) 150, the campus network(s) 152, the branch office network(s) 154, the home office network(s) 156, cloud service provider network(s), etc.), and a pair of Internet transport networks 160A and 160B (collectively, 160). The management network 202 can include one or more network orchestrator appliances 104, one or more network management appliance 122, and one or more network controller appliances 132. Although the management network 202 is shown as a single network in this example, one of ordinary skill in the art will understand that each element of the management network 202 can be distributed across any number of networks and/or be co-located with the sites 204. In this example, each element of the management network 202 can be reached through either transport network 160A or 160B.

Each site can include one or more endpoints 206 connected to one or more site network devices 208. The endpoints 206 can include general purpose computing devices (e.g., servers, workstations, desktop computers, etc.), mobile computing devices (e.g., laptops, tablets, mobile phones, etc.), wearable devices (e.g., watches, glasses or other head-mounted displays (HMDs), ear devices, etc.), and so forth. The endpoints 206 can also include Internet of Things (IoT) devices or equipment, such as agricultural equipment (e.g., livestock tracking and management systems, watering devices, unmanned aerial vehicles (UAVs), etc.); connected cars and other vehicles; smart home sensors and devices (e.g., alarm systems, security cameras, lighting, appliances, media players, HVAC equipment, utility meters, windows, automatic doors, doorbells, locks, etc.); office equipment (e.g., desktop phones, copiers, fax machines, etc.); healthcare devices (e.g., pacemakers, biometric sensors, medical equipment, etc.); industrial equipment (e.g., robots, factory machinery, construction equipment, industrial sensors, etc.); retail equipment (e.g., vending machines, point of sale (POS) devices, Radio Frequency Identification (RFID) tags, etc.); smart city devices (e.g., street lamps, parking meters, waste management sensors, etc.); transportation and logistical equipment (e.g., turnstiles, rental car trackers, navigational devices, inventory monitors, etc.); and so forth.

The site network devices 208 can include physical or virtual switches, routers, and other network devices. Although the site 204A is shown including a pair of site network devices and the site 204B is shown including a single site network device in this example, the site network devices 208 can comprise any number of network devices in any network topology, including multi-tier (e.g., core, distribution, and access tiers), spine-and-leaf, mesh, tree, bus, hub and spoke, and so forth. For example, in some embodiments, one or more data center networks may implement the Cisco® Application Centric Infrastructure (ACI) architecture and/or one or more campus networks may implement the Cisco® Software Defined Access (SD-Access or SDA) architecture. The site network devices 208 can connect the endpoints 206 to one or more edge network devices 142, and the edge network devices 142 can be used to directly connect to the transport networks 160.

In some embodiments, "color" can be used to identify an individual WAN transport network, and different WAN transport networks may be assigned different colors (e.g., mpls, private1, biz-internet, metro-ethernet, lte, etc.). In this example, the network topology 200 can utilize a color called "biz-internet" for the Internet transport network 160A and a color called "public-internet" for the Internet transport network 160B.

In some embodiments, each edge network device 208 can form a Datagram Transport Layer Security (DTLS) or TLS control connection to the network controller appliance(s) 132 and connect to any network control appliance 132 over each transport network 160. In some embodiments, the edge network devices 142 can also securely connect to edge network devices in other sites via IPSec tunnels. In some embodiments, the BFD protocol may be used within each of these tunnels to detect loss, latency, jitter, and path failures.

On the edge network devices 142, color can be used help to identify or distinguish an individual WAN transport tunnel (e.g., no same color may be used twice on a single edge network device). Colors by themselves can also have significance. For example, the colors metro-ethernet, mpls, and private1, private2, private3, private4, private5, and private6 may be considered private colors, which can be used for private networks or in places where there is no NAT addressing of the transport IP endpoints (e.g., because there may be no NAT between two endpoints of the same color). When the edge network devices 142 use a private color, they may attempt to build IPSec tunnels to other edge network devices using native, private, underlay IP addresses. The public colors can include 3g, biz, internet, blue, bronze, custom1, custom2, custom3, default, gold, green, lte, public-internet, red, and silver. The public colors may be used by the edge network devices 142 to build tunnels to post-NAT IP addresses (if there is NAT involved). If the edge network devices 142 use private colors and need NAT to communicate to other private colors, the carrier setting in the configuration can dictate whether the edge network devices 142 use private or public IP addresses. Using this setting, two private colors can establish a session when one or both are using NAT.

Figure 3:
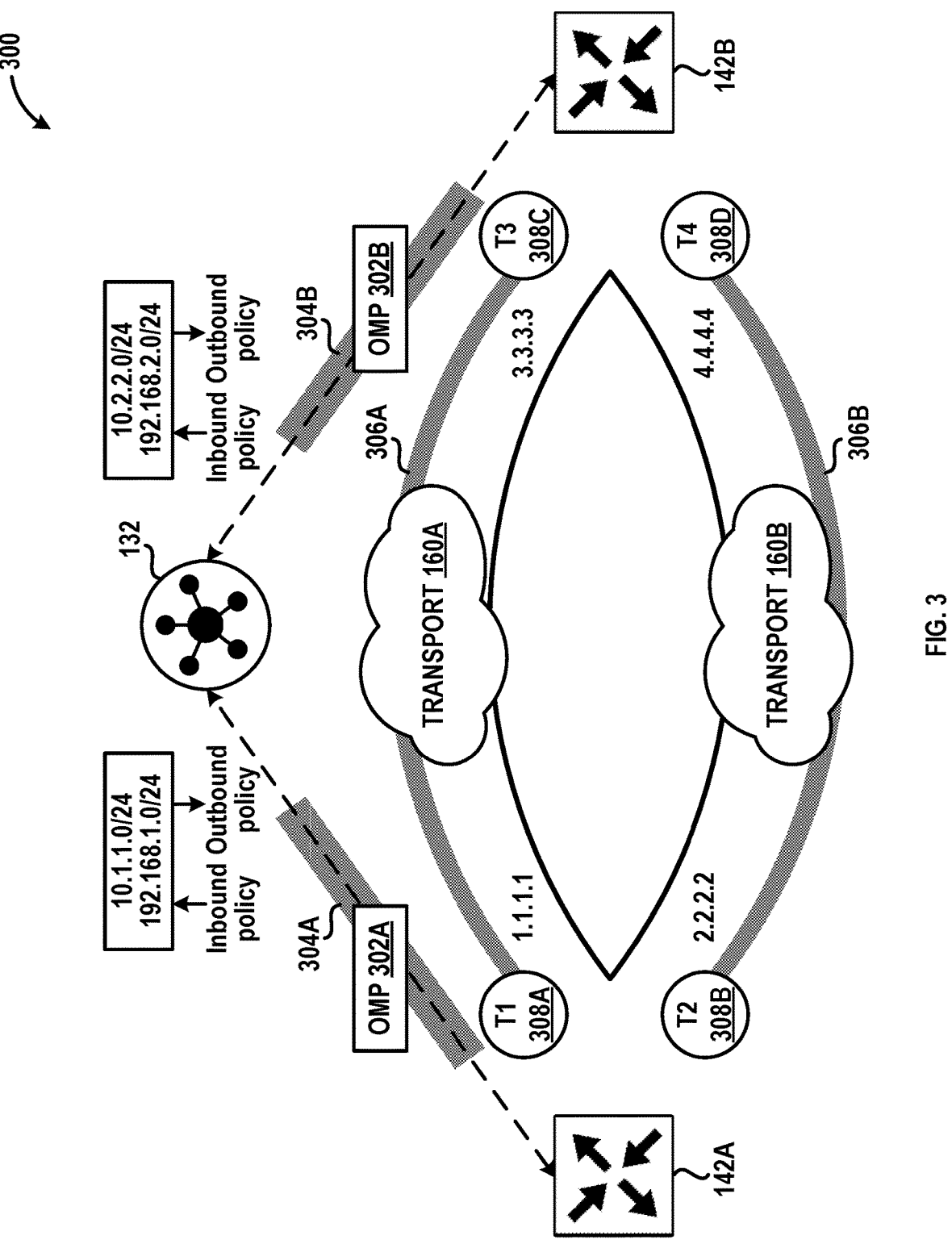
FIG. 3 illustrates an example of a diagram showing the operation of a protocol for managing an overlay network in accordance with some aspects of the present technology.

FIG. 3 illustrates an example of a diagram 300 showing the operation of OMP, which may be used in some embodiments to manage an overlay of a network (e.g., the network architecture 100). In this example, OMP messages 302A and 302B (collectively, 302) may be transmitted back and forth between the network controller appliance 132 and the edge network devices 142A and 142B, respectively, where control plane information, such as route prefixes, next-hop routes, crypto keys, policy information, and so forth, can be exchanged over respective secure DTLS or TLS connections 304A and 304B. The network controller appliance 132 can operate similarly to a route reflector. For example, the network controller appliance 132 can receive routes from the edge network devices 142, process and apply any policies to them, and advertise routes to other edge network devices 142 in the overlay. If there is no policy defined, the edge network devices 142 may behave in a manner similar to a full mesh topology, where each edge network device 142 can connect directly to another edge network device 142 at another site and receive full routing information from each site.

OMP can advertise three types of routes:

OMP routes, which can correspond to prefixes that are learned from the local site, or service side, of the edge network device 142. The prefixes can be originated as static or connected routes, or from within, for example, the OSPF or BGP protocols, and redistributed into OMP so they can be carried across the overlay. OMP routes can advertise attributes such as transport location (TLOC) information (which can similar to a BGP next-hop IP address) and other attributes such as origin, originator, preference, site identifier, tag, and virtual private network (VPN). An OMP route may be installed in the forwarding table if the TLOC to which it points is active.

TLOC routes, which can correspond to logical tunnel termination points on the edge network devices 142 that connect into the transport networks 160. In some embodiments, a TLOC route can be uniquely identified and represented by a three-tuple, including an IP address, link color, and encapsulation (e.g., Generic Routing Encapsulation (GRE), IPSec, etc.). In addition to system IP address, color, and encapsulation, TLOC routes can also carry attributes such as TLOC private and public IP addresses, carrier, preference, site identifier, tag, and weight. In some embodiments, a TLOC may be in an active state on a particular edge network device 142 when an active BFD session is associated with that TLOC.

Service routes, which can represent services (e.g., firewall, distributed denial of service (DDoS) mitigator, load balancer, intrusion prevent system (IPS), intrusion detection systems (IDS), WAN optimizer, etc.) that may be connected to the local sites of the edge network devices 142 and accessible to other sites for use with service insertion. In addition, these routes can also include VPNs; the VPN labels can be sent in an update type to tell the network controller appliance 132 what VPNs are serviced at a remote site.

In the example of FIG. 3, OMP is shown running over the DTLS/TLS tunnels 304 established between the edge network devices 142 and the network controller appliance 132. In addition, the diagram 300 shows an IPSec tunnel 306A established between TLOC 308A and 308C over the WAN transport network 160A and an IPSec tunnel 306B established between TLOC 308B and TLOC 308D over the WAN transport network 160B. Once the IPSec tunnels 306A and 306B are established, BFD can be enabled across each of them.

Virtual Private Networks

Figure 4:
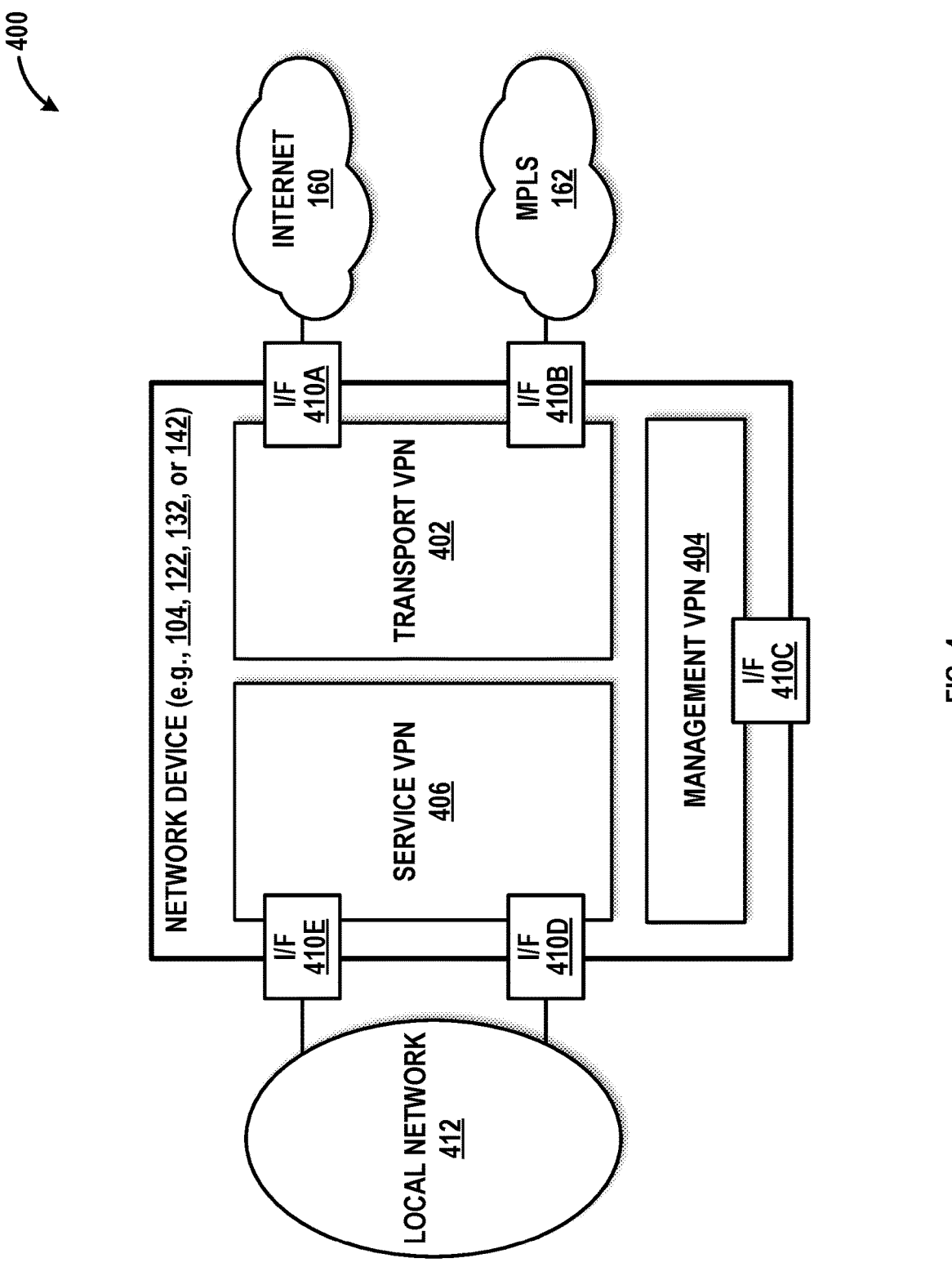
FIG. 4 illustrates an example of a diagram showing the operation of virtual private networks for segmenting a network in accordance with some aspects of the present technology.

FIG. 4 illustrates an example of a diagram 400 showing the operation of VPNs, which may be used in some embodiments to provide segmentation for a network (e.g., the network architecture 100). VPNs can be isolated from one another and can have their own forwarding tables. An interface or sub-interface can be explicitly configured under a single VPN and may not be part of more than one VPN. Labels may be used in OMP route attributes and in the packet encapsulation, which can identify the VPN to which a packet belongs. The VPN number can be a four-byte integer with a value from 0 to 65530. In some embodiments, the network orchestrator appliance(s) 104, network management appliance(s) 122, network controller appliance(s) 132, and/or edge network device(s) 142 can each include a transport VPN 402 (e.g., VPN number 0) and a management VPN 404 (e.g., VPN number 512). The transport VPN 402 can include one or more physical or virtual network interfaces (e.g., network interfaces 410A and 410B) that respectively connect to WAN transport networks (e.g., the MPLS network 162 and the Internet transport network 160). Secure DTLS/TLS connections to the network controller appliance(s) 132 or between the network controller appliance(s) 132 and the network orchestrator appliance(s) 104 can be initiated from the transport VPN 402. In addition, static or default routes or a dynamic routing protocol can be configured inside the transport VPN 402 to get appropriate next-hop information so that the control plane 130 may be established and IPSec tunnels 306 (not shown) can connect to remote sites.

The management VPN 404 can carry out-of-band management traffic to and from the network orchestrator appliance(s) 104, network management appliance(s) 122, network controller appliance(s) 132, and/or edge network device(s) 142 over a network interface 410C. In some embodiments, the management VPN 404 may not be carried across the overlay network.

In addition to the transport VPN 402 and the management VPN 404, the network orchestrator appliance(s) 104, network management appliance(s) 122, network controller appliance(s) 132, or edge network device(s) 142 can also include one or more service-side VPNs 406. The service-side VPN 406 can include one or more physical or virtual network interfaces (e.g., network interfaces 410D and 410E) that connect to one or more local-site networks 412 and carry user data traffic. The service-side VPN(s) 406 can be enabled for features such as OSPF or BGP, Virtual Router Redundancy Protocol (VRRP), QoS, traffic shaping, policing, and so forth. In some embodiments, user traffic can be directed over IPSec tunnels to other sites by redistributing OMP routes received from the network controller appliance(s) 132 at the local-site networks 412 into the service-side VPN routing protocol. In turn, routes from the local-site networks 412 can be advertised to other sites by advertising the service VPN routes into the OMP routing protocol, which can be sent to the network controller appliance(s) 132 and redistributed to other edge network devices 142 in the network. Although the network interfaces 410A-E (collectively, 410) are shown to be physical interfaces in this example, one of ordinary skill in the art will appreciate that the interfaces 410 in the transport and service VPNs can also be sub-interfaces instead.

Network Device

Figure 5A:
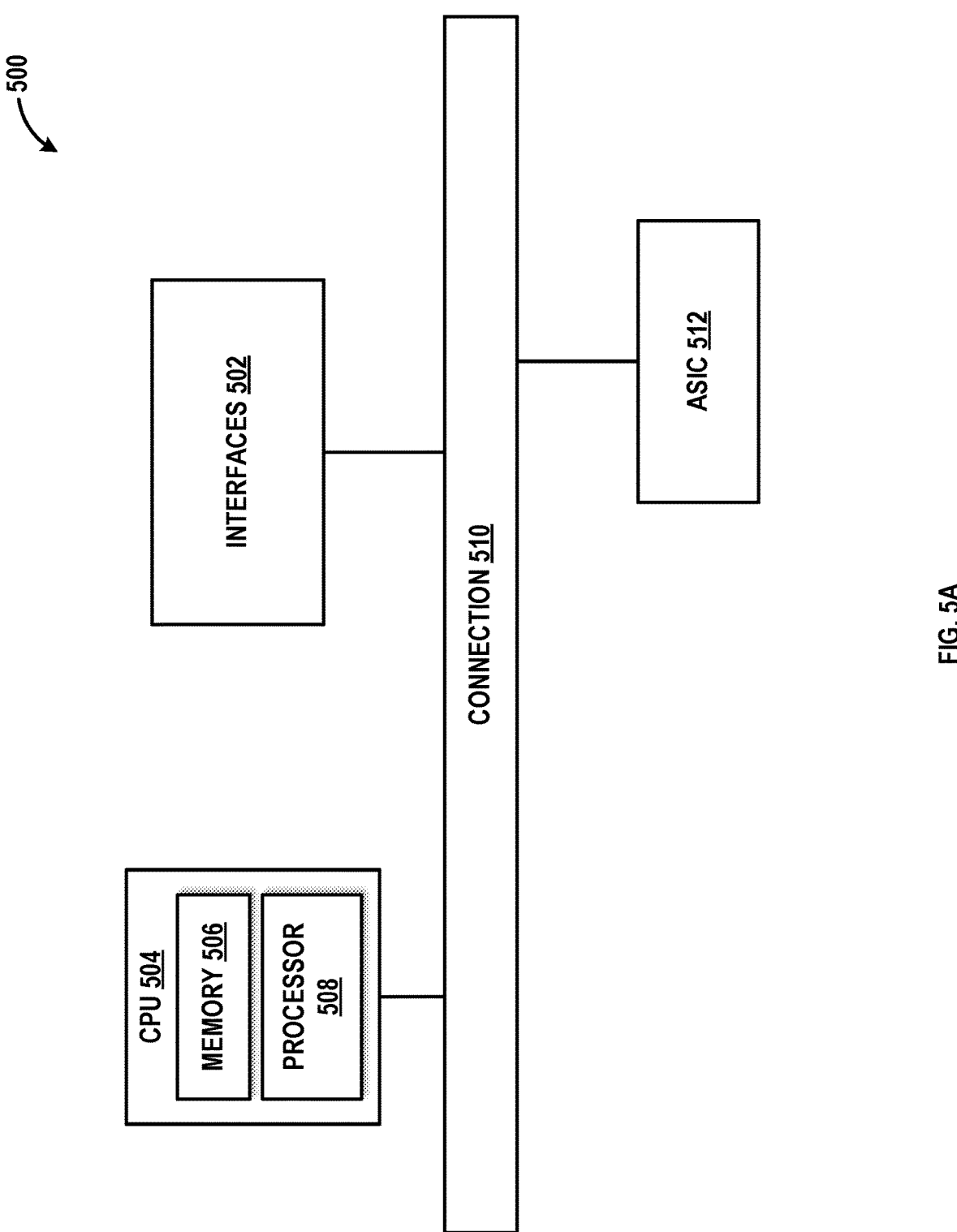
FIG. 5A illustrates an example network device in accordance with some aspects of the present technology.

FIG. 5A illustrates an example network device 500 suitable for performing switching, routing, load balancing, and other networking operations. The example network device 500 can be implemented as switches, routers, nodes, metadata servers, load balancers, client devices, and so forth.

Network device 500 includes a central processing unit (CPU) 504, interfaces 502, and a bus 510 (e.g., a PCI bus). When acting under the control of appropriate software or firmware, the CPU 504 is responsible for executing packet management, error detection, and/or routing functions. The CPU 504 preferably accomplishes all these functions under the control of software including an operating system and any appropriate applications software. CPU 504 may include one or more processors 508, such as a processor from the INTEL X86 family of microprocessors. In some cases, processor 508 can be specially designed hardware for controlling the operations of network device 500. In some cases, a memory 506 (e.g., non-volatile RAM, ROM, etc.) also forms part of CPU 504. However, there are many different ways in which memory could be coupled to the system.

The interfaces 502 are typically provided as modular interface cards (sometimes referred to as "line cards"). Generally, they control the sending and receiving of data packets over the network and sometimes support other peripherals used with the network device 500. Among the interfaces that may be provided are Ethernet interfaces, frame relay interfaces, cable interfaces, DSL interfaces, token ring interfaces, and the like. In addition, various very high-speed interfaces may be provided such as fast token ring interfaces, wireless interfaces, Ethernet interfaces, Gigabit Ethernet interfaces, ATM interfaces, HSSI interfaces, POS interfaces, FDDI interfaces, WIFI interfaces, 3G/4G/5G cellular interfaces, CAN BUS, LoRA, and the like. Generally, these interfaces may include ports appropriate for communication with the appropriate media. In some cases, they may also include an independent processor and, in some instances, volatile RAM. The independent processors may control such communications intensive tasks as packet switching, media control, signal processing, crypto processing, and management. By providing separate processors for the communication intensive tasks, these interfaces allow the master CPU (e.g., 504) to efficiently perform routing computations, network diagnostics, security functions, etc.

Although the system shown in FIG. 5A is one specific network device of the present disclosure, it is by no means the only network device architecture on which the present disclosure can be implemented. For example, an architecture having a single processor that handles communications as well as routing computations, etc., is often used. Further, other types of interfaces and media could also be used with the network device 500.

Regardless of the network device's configuration, it may employ one or more memories or memory modules (including memory 506) configured to store program instructions for the general-purpose network operations and mechanisms for roaming, route optimization and routing functions described herein. The program instructions may control the operation of an operating system and/or one or more applications, for example. The memory or memories may also be configured to store tables such as mobility binding, registration, and association tables, etc. Memory 506 could also hold various software containers and virtualized execution environments and data.

The network device 500 can also include an application-specific integrated circuit (ASIC), which can be configured to perform routing and/or switching operations. The ASIC can communicate with other components in the network device 500 via the bus 510, to exchange data and signals and coordinate various types of operations by the network device 500, such as routing, switching, and/or data storage operations, for example.

Figure 5B:
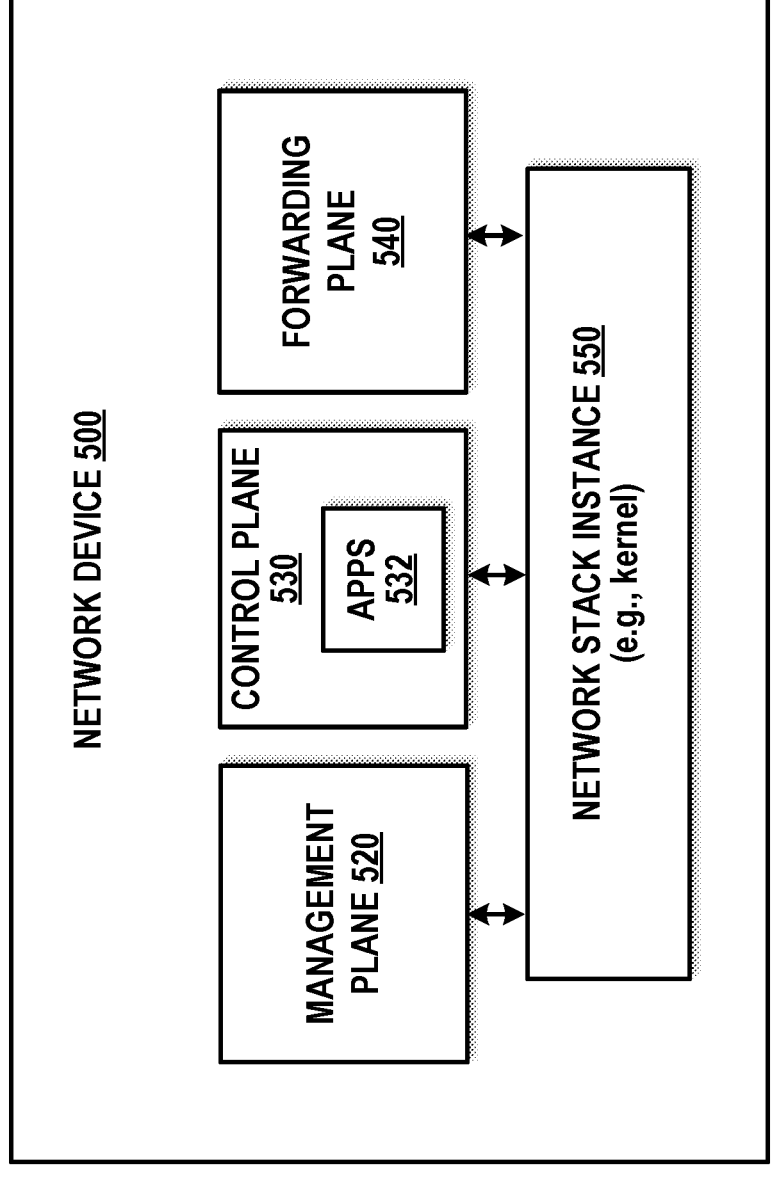
FIG. 5B illustrates the example network device of FIG. 5A including a control plane, a forwarding plane, and a network stack instance in accordance with some aspects of the present technology.

FIG. 5B illustrates further aspects of example network device 500. Example network device 500 can include various planes, including a management plane 520, a control plane 530 in which one or more applications 532 can operate, and a Forwarding Plane 540 (also referred to as "data plane") that facilitates communication to and from other connected devices. The management plane 520, the control plane 530, and the Forwarding Plane 540 can communicate with one another through a Network Stack Instance 550. The Network Stack Instance 550 can be implemented, for example as a Linux kernel.

Network elements such as SD-WAN cEdge routers use a distributed architecture for control plane 530 and Forwarding Plane 540. In some examples, most of the control plane functionality is implemented on an entity called 'Routing Plane (RP) complex' and data plane functionality is implemented on an entity called 'Forwarding Plane (FP) complex'. Most of the Network Forwarding (such as IP forwarding) functionality is implemented on the 'Forwarding Plane complex.

Usually, the control plane applications require the Network Stack Instance 550 (TCP/UDP) and common kernel interfaces ("sockets") to be implemented on the general-purpose Routing Plane (RP) complex. Such applications often require the ability to originate/exchange network packets in different network segments (for example, called Virtual routing and forwarding (VRF) in IOS-XE terms or Virtual Private Networks (VPNs) in Cisco SD-WAN terms). For example, Cisco SD-WAN generates different kinds of tracking-related traffic (trackers, etc.), and other control related traffic such as routing/DNS in user defined VRFs. The list is not limited to these examples. Further, there is also a need to run third party applications on the Cisco IOS-XE based platforms. These third-party applications often make "socket calls" requesting sockets and/or individual namespaces.

In order to implement such applications, Linux forwarding transport service (LFTS) was previously implemented when Cisco SD-WAN was released on Cisco IOS-XE platforms. In the existing implementations, each network segment/VPN was implemented with its own network namespace in the Network Stack Instance (in Linux terms, a "kernel"). Inside each namespace, there is pseudo-network device (sometimes called "LFTS"). Each pseudo-network device handles network encapsulation/decapsulation of necessary metadata between the control plane and the forwarding plane. One such metadata is an identifier for network segment/VPN. Many third party solutions also uses network namespaces to create isolation ("ip netns" . . . ).

Problems with Current Technologies

Figure 6:
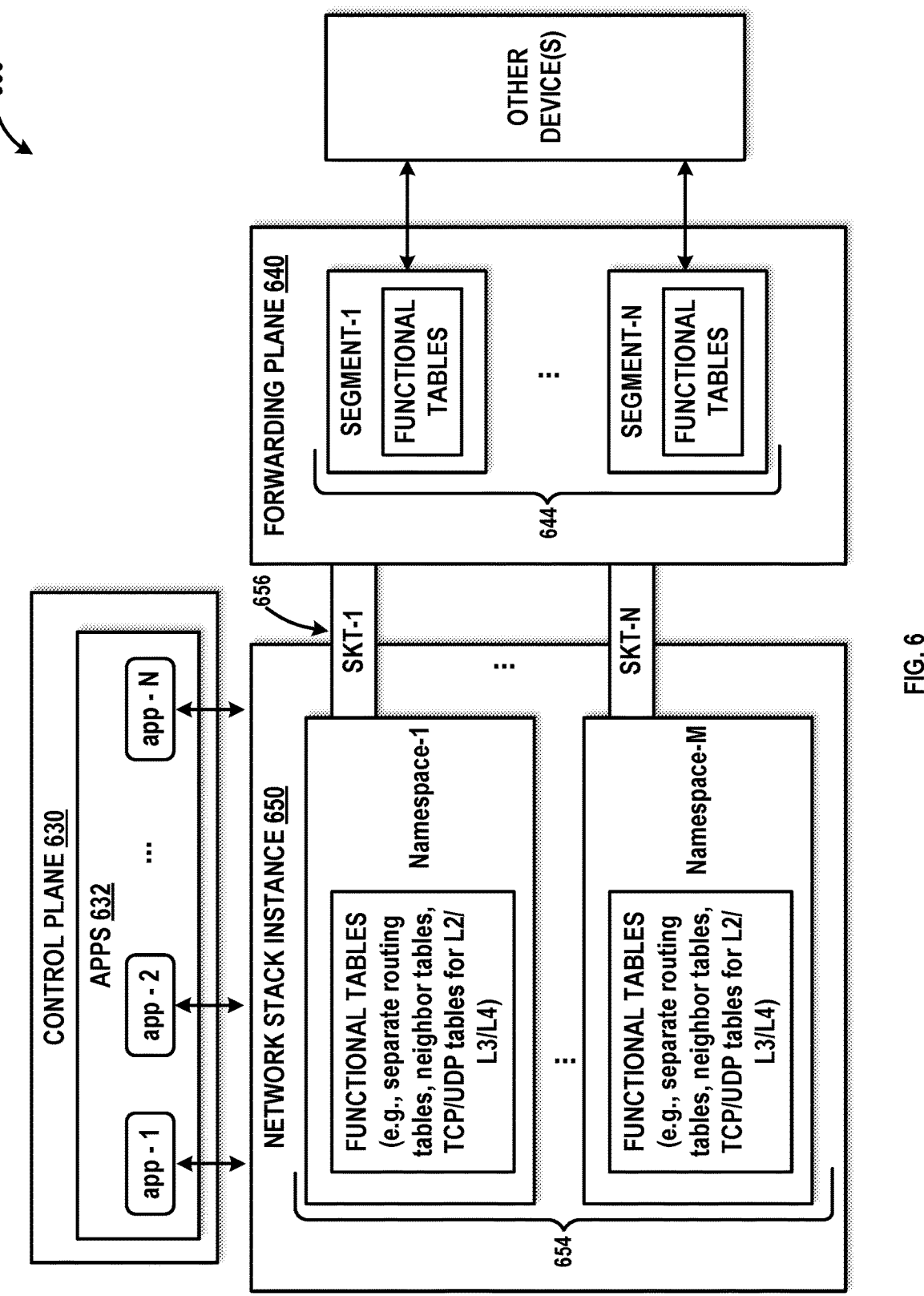
FIG. 6 illustrates a network device that implements a previous method of establishing a socket interface between an application and a network segment at a network stack instance, where the network stack instance requires memory for multiple namespaces.

FIG. 6 illustrates the problem to be solved by the methods outlined herein (the solutions are shown in FIGS. 7-9E). In particular, FIG. 6 shows an implementation of a network device 600 where more than one namespace 654 (e.g., Namespace-1 . . . Namespace-M) is implemented in a Network Stack Instance 650 for communication between different applications 632 (e.g., app-1, app-2, . . . app-N) associated with a control plane 630 and a Forwarding Plane 640. An application 632 (e.g., app-1) can send a socket call to the Network Stack Instance 650 to open a socket 656 (e.g., SKT-1) in a network segment 644 (along with a namespace 654) which may or may not be specified by the application 632. In these implementations, the Network Stack Instance 650 will usually open a namespace 654 (e.g., Namespace-1) dedicated to the application (or group of applications belonging to the same software container). As such, at a given time the Network Stack Instance 650 will likely have multiple namespaces 654 open that each service various applications and network segments. The problem with such implementation is that the network isolation overhead for each namespace is often very high, particularly with regards to memory. This causes significant loss and redundancies in products/solutions where most of the network forwarding segmentation is already implemented at the Forwarding Plane 640.

To illustrate, once a network namespace is created, Linux kernel (e.g., as Network Stack Instance 650) usually reserves around 1.1 MB of memory for each network namespace. This memory is reserved for routing/neighbor tables and L2/L3/L4 level tables (i.e., separate routing table, separate TCP/UDP tables, etc,). Again, much of this information is redundant as it is also retained within the Forwarding Plane 640. In order to support 1000 VPNs on the network device 600, around 1.1 GB memory would be needed at the Routing Plane complex in addition to memory required for other features on the RP. This increases the cost of the device.

Improving Scaling Efficiency Using a Single Namespace

Figure 7:
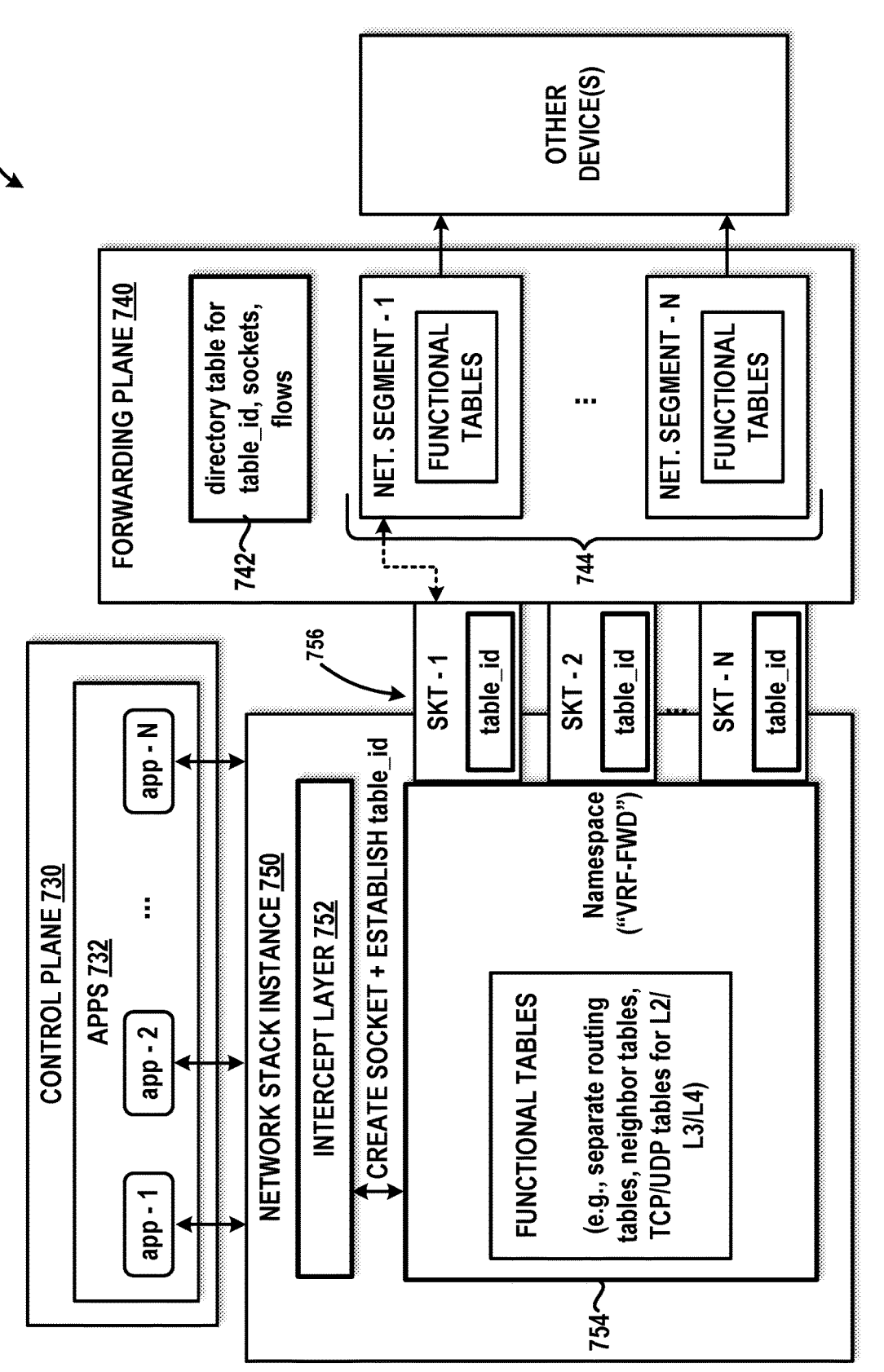
FIG. 7 illustrates a network device in accordance with some aspects of the present technology that implements a method of establishing a socket interface between an application and a network segment at a network stack instance through a single namespace to conserve memory overhead.

In contrast, FIG. 7 shows an implementation of a network device 700 according to the solutions outlined herein that avoids isolating network namespaces in a Network Stack Instance 750. The network device 700 can still open sockets 756 for a plurality of applications 732 associated with a control plane 730 and a Forwarding Plane 740, however the network device 700 improves scaling and supports higher network segmentation without the need to increase the memory on the network device 700 for the Routing Plane complex. In particular, the network device 700 of FIG. 7 improves scaling efficiency for routing devices that service multiple applications through multiple network segments and aims to reduce memory overhead associated network segmentation in the Network Stack Instance 750. The network device 700 achieves this by establishing a single namespace 754 (e.g., namespace "VRF-FWD") that services a plurality of network segments 744, instead of establishing multiple namespaces (e.g., namespaces 654 of FIG. 6) where each namespace serves an individual network segment.

The network device 700 establishes the single namespace 754 within the Network Stack Instance 750 (in Linux, this is referred to as the "kernel") of the network device 700. The network device 700 can access socket calls from one or more applications 732 associated with the control plane 730, and can open sockets 756 (e.g., SKT-1, SKT-2, . . . SKT-N) between the Network Stack Instance 750 and the Forwarding Plane 740 on behalf of the one or more applications 732. The network device 700 can associate the socket 756 with the application 732, a network segment 744, and packets for a flow using a table identifier ("table_id"). The network device 700 can leverage existing separation within the Forwarding Plane 740 along with the table IDs to identify where packets belong, eliminating redundancies associated with existing systems that require reserving significant amounts of memory for multiple namespaces. The Forwarding Plane 740 can maintain a table 742 that can serve as a directory for table IDs and their respective flows, network segments, sockets, and applications.

In some examples, the network device 700 can use an application programming interface (API) (e.g., implemented through "set sock" option for Linux) that some applications can use to specify the table ID upon opening a socket. The Network Stack Instance 750 can also include an intercept layer 752 that intercepts some socket calls and establishes compatibility with third-party applications that would otherwise expect individual namespaces when opening a socket.

For sending packets of a flow from an application ("inject" direction), the network device 700 can read a table ID from the socket associated with the application, and appends the table ID to metadata of the packet before sending the packet to the Forwarding Plane 740, which can forward the packet onward to a destination device. Upon receipt of a packet of a flow that needs to go to an application ("punt" direction), the Forwarding Plane 740 of the network device 700 reads the table ID from the metadata, and provides it to a socket lookup function. The socket lookup function uses the table ID in addition to tuple information (IP addresses, port numbers, protocol number) to locate a socket for the packet. Thus, in both directions, packets are flowing through the Network Stack Instance 750 and through multiple network segments without the need to create or maintain extra network namespaces to handle them. In a further aspect, metadata can be extended to include more information for various use cases.

Figure 8A:
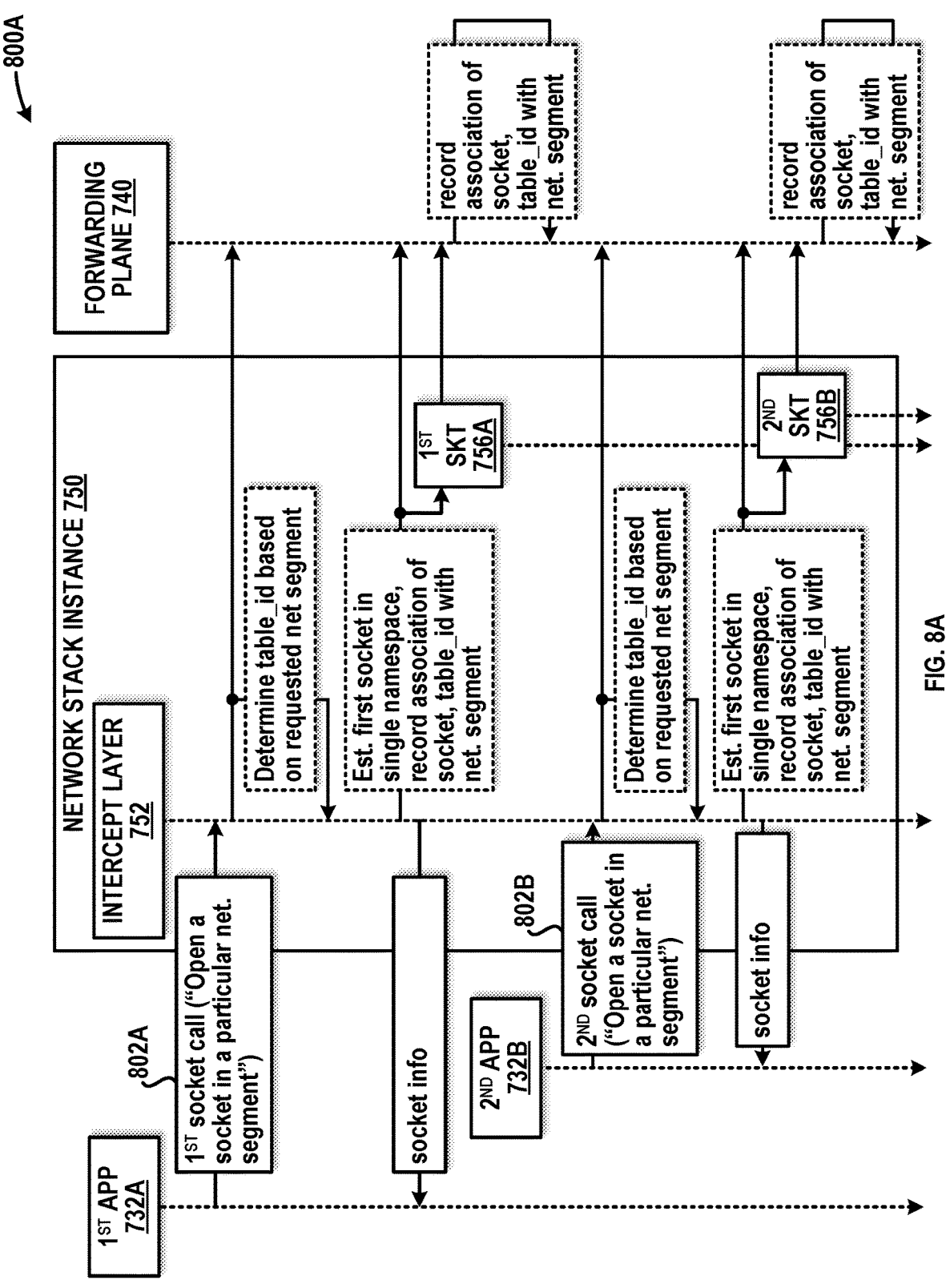
FIGS. 8A-8C illustrate sequence diagrams outlining aspects of the method of FIG. 7 in accordance with some aspects of the present technology.

FIG. 8A is a first sequence diagram 800A showing how the network device 700 (FIG. 7) can set up sockets for two different applications in a single namespace.

The Network Stack Instance 750 can access a first socket call 802A from a first application 732A of the network device 700, the first application 732A being associated with a first network segment (e.g., a first VPN). If the first socket call 802A natively designates a first table ID (e.g., using the API), then the first table ID is used by the network device 700 for establishing a first socket interface 756A. Alternatively, if the first socket call 802A does not natively designate the first table ID (e.g., if the first application is a third-party application that expects a network segment in a separate namespace, etc.), then the intercept layer 752 can determine the first table ID based on the requested network segment associated with the first socket call 802A. The Network Stack Instance 750 then establishes the first socket interface 756A associated with the single namespace for the first application 732A, the first socket interface 756A having the first table ID that correlates the first application 732A with the first network segment, and the first socket interface 756A establishing a first connection between the Network Stack Instance 750 and a Forwarding Plane 740 of the network device 700. The Forwarding Plane 740 can record association of the first socket interface 756A and the first table ID with the first network segment for the first application 732A. The Network Stack Instance 750 can also provide information about the first socket interface 756A back to the first application 732A, such that the first application 732A can directly identify the first socket interface 756A when sending out packets.

The Network Stack Instance 750 can also access a second socket call 802B from a second application 732B of the network device 700, the second application 732B being associated with a second network segment (e.g., a second VPN). Likewise, if the second socket call 802B natively designates a table ID (e.g., using the API), then the second table ID is used by the network device 700 for establishing a second socket interface 756B. Alternatively, if the second socket call 802B does not natively designate a table ID (e.g., if the second application is a third-party application that expects a network segment in a separate namespace, etc.), then the intercept layer 752 can determine a table ID based on the requested network segment associated with the second socket call 802B. The network device 700 then establishes the second socket interface 756B associated with the single namespace for the second application 732B, the second socket interface 756B having the second table ID that correlates the second application 732B with the second network segment, and the second socket interface 756B establishing a second connection between the Network Stack Instance 750 and the Forwarding Plane 740 of the network device 700. The Forwarding Plane 740 can record association of the second socket interface 756B and the second table ID with the network segment for the second application 732B. The Network Stack Instance 750 can also provide information about the second socket interface 756B back to the second application 732B, such that the second application 732B can directly identify the second socket interface 756B when sending out packets.

Figure 8B:
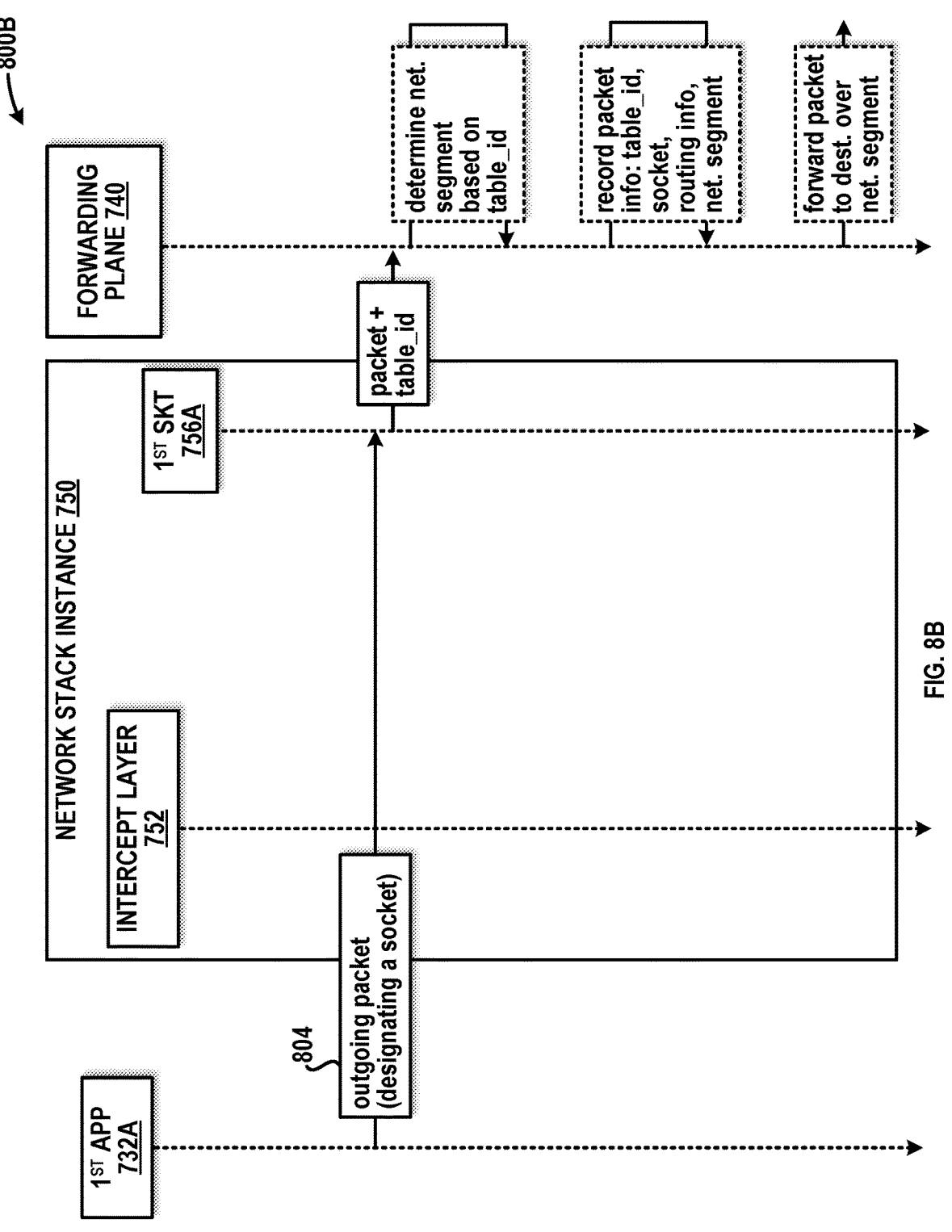

FIG. 8B is a second sequence diagram 800B showing outgoing packet handling by the network device 700. Note that while the below discussion referencing FIG. 8B is provided in terms of packets belonging to a first flow (e.g., from a first application, through a first socket interface and a first network segment), the concepts can be similarly applied to additional flows from additional applications through additional socket interfaces and network segments (e.g., a second flow from a second application, through a second socket interface and a second network segment).

Following setup of the first socket interface 756A as discussed above with reference to FIG. 8A, the Network Stack Instance 750 can receive an outgoing packet 804 from an application (as an example, the first application 732A) that designates the first socket interface 756A. The Network Stack Instance 750 can modify the outgoing packet 804 to include the table ID associated with the first socket interface 756A, and can forward the outgoing packet 804 onward to the Forwarding Plane 740 of the network device 700 through the first socket interface 756A. The Forwarding Plane 740 can identify the correct network segment for the outgoing packet 804 based on the table ID, and can record packet information (e.g., the table ID, information about the first socket interface 756A, routing information, network segment). The Forwarding Plane 740 can then forward the outgoing packet 804 onward to a destination device over the network segment.

Figure 8C:
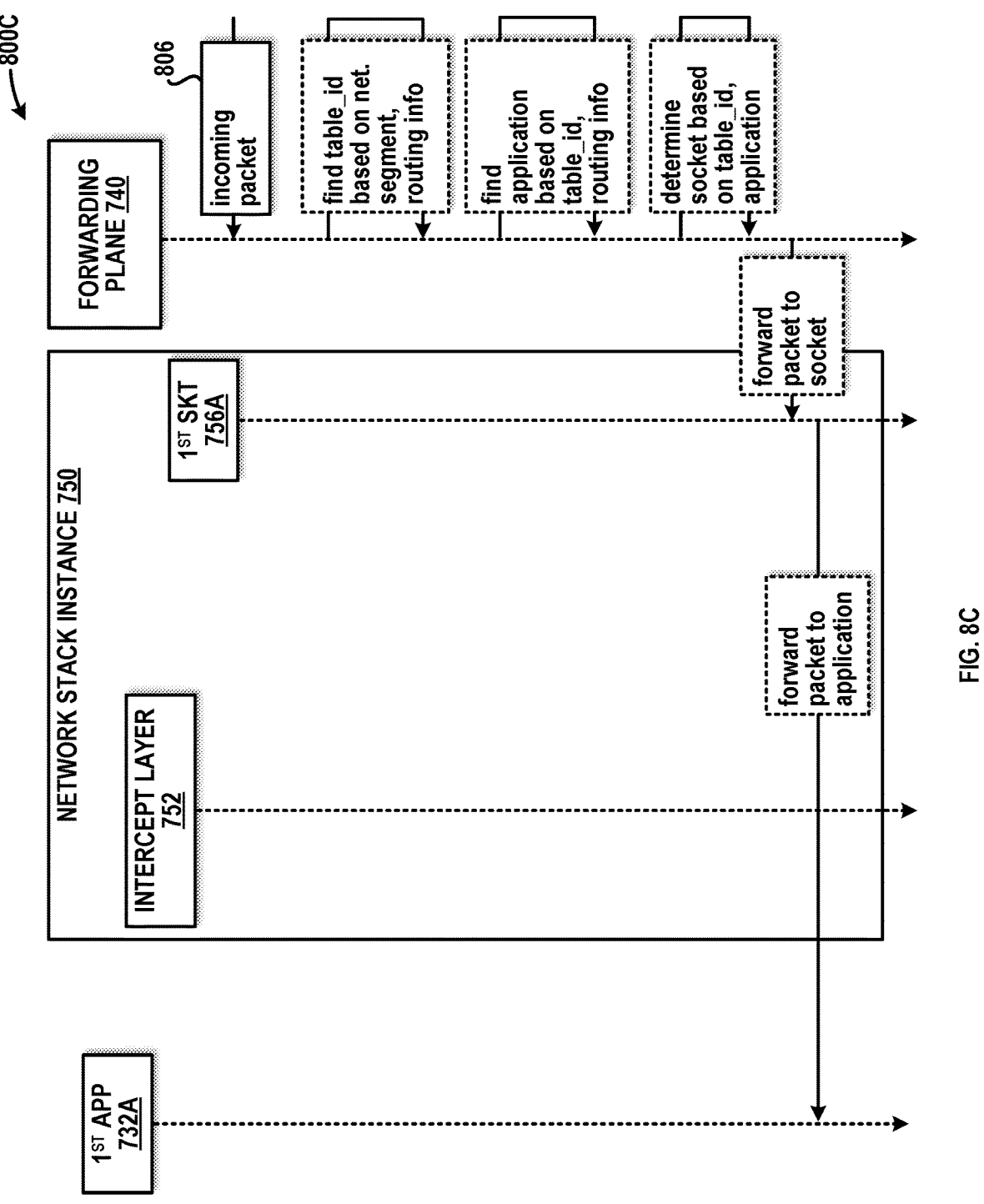

FIG. 8C is a third sequence diagram 800C showing incoming packet handling by the network device 700. Note that while the below discussion referencing FIG. 8C is provided in terms of packets belonging to a first flow (e.g., to a first application, through a first socket interface and a first network segment), the concepts can be similarly applied to additional flows to additional applications through additional socket interfaces and network segments (e.g., a second flow to a second application, through a second socket interface and a second network segment).

The Forwarding Plane 740 can receive an incoming packet 806 destined for an application (as an example, the first application 732A), and can find the appropriate table ID for the incoming packet 806 based on the network segment and/or routing information associated with the packet. Using the table ID and the routing information, the Forwarding Plane 740 can find the appropriate application for the incoming packet 806 (in this case, the first application 732A). The Forwarding Plane 740 can also find the appropriate socket (e.g., the first socket interface 756A) for the incoming packet 806 based on the table ID and the application. Using this information, the Forwarding Plane 740 can forward the incoming packet 806 to the first application 732A through the first socket interface 756A of the Network Stack Instance 750.

Process

FIGS. 9A-9E are a series of process flow diagrams illustrating the functionalities discussed above with reference to FIGS. 7-8C.

FIG. 9A starts process 900 at step 902, which includes establishing a single namespace within a Network Stack Instance of a network device. Step 904 has two options (e.g., step 904A elaborated on in FIG. 9B or step 904B elaborated on in FIG. 9C).

Step 904A shown in FIG. 9B pertains to when the first socket call does not natively designate a table ID (e.g., if the first application is a third-party application that expects a network segment in a separate namespace, etc.). Step 904A-1 shown in FIG. 9B includes intercepting a first socket call from a first application, the first socket call including a request for a socket interface in a requested namespace. Step 904A-2 includes determining, based on the requested namespace, a first table identifier to be associated with a first socket interface and a first network segment for the first application.

Step 904B shown in FIG. 9C pertains to when the first socket call natively designates a table ID (e.g., using the API). As such, step 904B includes receiving an API call from a first application requesting a first table identifier be associated with a first socket interface and a first network segment for the first application.

As further shown in FIG. 9A, step 906 includes associating a first socket interface and a first network segment with a first table identifier, wherein the first table identifier is an identifier to an entry in a table stored in the single namespace. Step 908 includes establishing a first socket interface associated with the single namespace for the first application, the first socket interface having the first table identifier that correlates the first application with the first network segment, and the first socket interface establishing a first connection between the Network Stack Instance and a Forwarding Plane of the network device. Step 910 includes recording, at a table stored at the Forwarding Plane, association of the first table identifier and the first network segment with the first socket interface of the Network Stack Instance for the first application.

Steps 912-916 pertain to handling a second socket call in the single namespace, much like the first socket call. Prior to step 912, the network device can similarly apply step 904A or 904B shown in FIG. 9B or 9C in terms of a second socket call from a second application.

Step 912 includes associating a second socket interface and a second network segment with a second table identifier, wherein the second table identifier is an identifier to an entry in the table stored in the single namespace. Step 914 includes establishing a second socket interface associated with the single namespace for the second application, the second socket interface having the second table identifier that correlates the second application with the second network segment, and the second socket interface establishing a second connection between the Network Stack Instance and the Forwarding Plane of the network device. Step 916 includes recording, at a table stored at the Forwarding Plane, association of the second table identifier and the second network segment with the second socket interface of the Network Stack Instance for the second application.

FIG. 9D discusses steps 918-928 of process 900 that are associated with processing an outgoing packet. While steps 918-928 are discussed in terms of a first flow involving the first application and the first socket (following steps 902-910 of FIG. 9A), note that these steps can be similarly applied to a second flow involving the second application and the second socket (following steps 912-916 of FIG. 9A). The second flow can be differentiated from the first flow (and vice-versa) by the second table identifier that associates packets of the second flow with the second socket, the second application, and the network segment associated with the second flow. The first table identifier and the second table identifier can enable the Network Stack Instance and the Forwarding Plane Complex to discern between flows that are present within the single namespace at the Network Stack Instance. Note that the Forwarding Plane Complex can still maintain individual tables for each individual flow, and that the first table identifier and the second table identifier enable the Forwarding Plane Complex to identify which tables or groups of tables that the respective flow should be associated with.

Steps 918-922 can be conducted at the Network Stack Instance. Step 918 of process 900 includes receiving a first outgoing packet from the first application at the Network Stack Instance, the first outgoing packet designating the first socket interface. Step 920 of process 900 includes appending the first table identifier to the first outgoing packet (which associates the first packet and subsequent packets in the first flow with the first socket and the first application, as well as any relevant tables in the Forwarding Plane complex). Step 922 of process 900 includes sending the first outgoing packet to the Forwarding Plane through the first socket interface.

Steps 924-928 can be conducted at the Forwarding Plane complex of the network device. Step 924 of process 900 includes accessing, at the Forwarding Plane, the first table identifier of the first outgoing packet (e.g., within metadata of the first outgoing packet). Step 926 of process 900 can include identifying the first network segment based on the first table identifier of the first outgoing packet. Step 928 of process 900 can include forwarding the first outgoing packet to a destination device over the first network segment.

FIG. 9E discusses steps 930-940 of process 900 that are associated with processing an incoming packet. Likewise, while steps 930-940 are discussed in terms of a first flow involving the first application and the first socket (following steps 902-910 of FIG. 9A), note that these steps can be similarly applied to a second flow involving the second application and the second socket (following steps 912-916 of FIG. 9A). The second flow can be differentiated from the first flow (and vice-versa) by the second table identifier that associates packets of the second flow with the second socket, the second application, and the network segment associated with the second flow. The first table identifier and the second table identifier can enable the Network Stack Instance and the Forwarding Plane Complex to discern between flows that are present within the single namespace at the Network Stack Instance. Note that the Forwarding Plane Complex can still maintain individual tables for each individual flow, and that the first table identifier and the second table identifier enable the Forwarding Plane Complex to identify which tables or groups of tables that the respective flow should be associated with.

Step 930 includes receiving a first incoming packet at the Forwarding Plane destined for the first application, the first incoming packet designating the first application. Step 932 includes identifying, at the Forwarding Plane, the first network segment of the first incoming packet. Step 934 includes identifying the first table identifier of the first incoming packet based on the first network segment. Step 936 includes identifying the first application based on the first table identifier of the first incoming packet. Step 938 includes identifying the first socket interface based on the first table identifier associated with the first application. Step 940 includes sending the first incoming packet to the first application through the first socket interface of the Network Stack Instance.

Computing System

Figure 10:
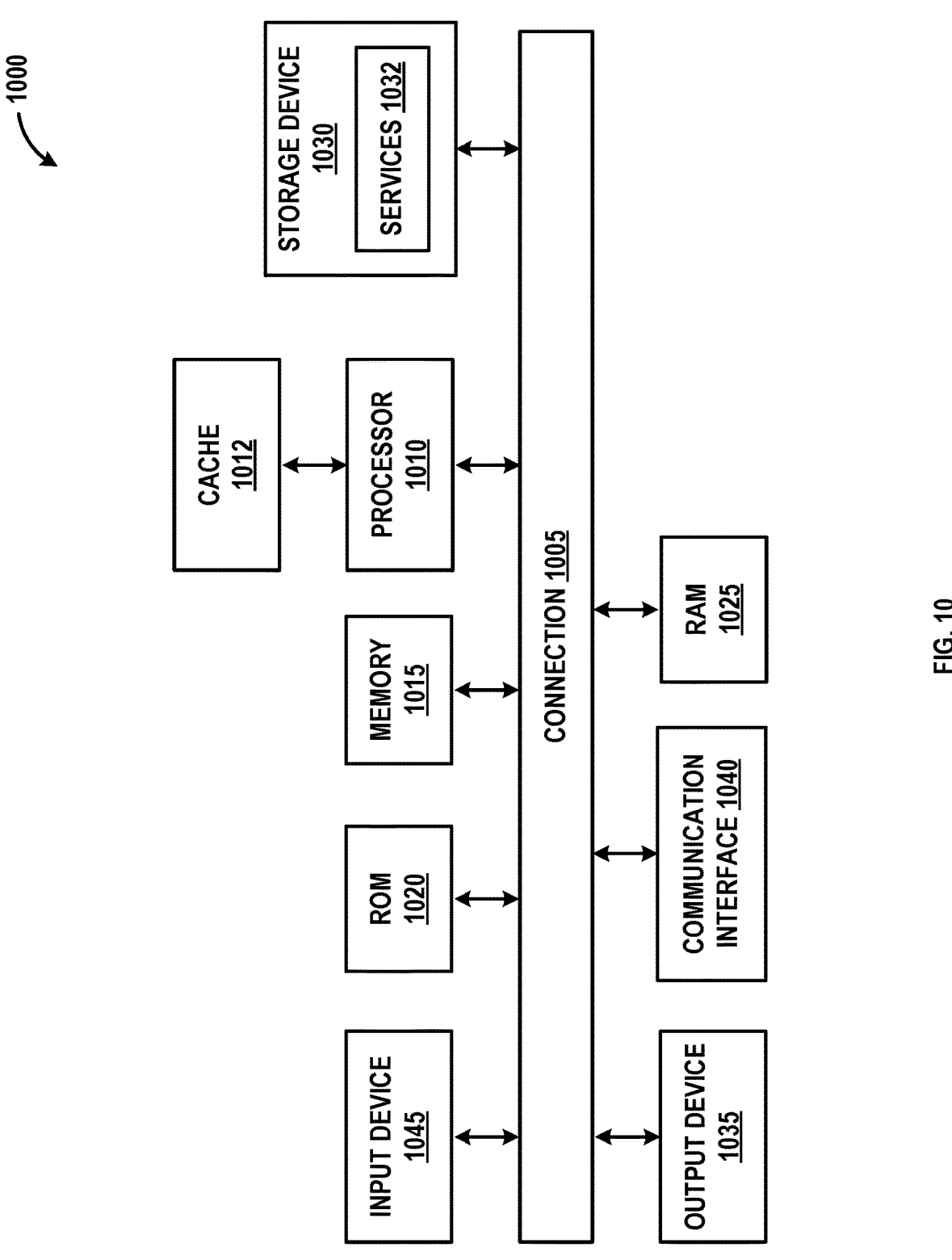
FIG. 10 illustrates an example of a bus computing system according to some aspects of the present technology.

FIG. 10 illustrates an example of a bus computing system, according to some aspects of the present disclosure. Computing system 1000 can be utilized as part of any one of the network components described above with reference to FIGS. 5A, 5B and 7-9E, and/or for otherwise configuring the network components as described above with reference to FIGS. 5A, 5B and 7-9E. Components of the computing system 1000 are in electrical communication with each other using a bus 1005. The computing system 1000 can include a processing unit (CPU or processor) 1010 and a system bus 1005 that may couple various system components including the system memory 1015, such as read only memory (ROM) 1020 and random access memory (RAM) 1025, to the processor 1010. The computing system 1000 can include a cache 1012 of high-speed memory connected directly with, in close proximity to, or integrated as part of the processor 1010. The computing system 1000 can copy data from the memory 1015, ROM 1020, RAM 1025, and/or storage device 1030 to the cache 1012 for quick access by the processor 1010. In this way, the cache 1012 can provide a performance boost that avoids processor delays while waiting for data. These and other modules can control the processor 1010 to perform various actions. Other system memory 1015 may be available for use as well. The memory 1015 can include multiple different types of memory with different performance characteristics. The processor 1010 can include any general-purpose processor and a hardware module or software module (services), such as services 1032 stored in the storage device 1030, configured to control the processor 1010 as well as a special-purpose processor where software instructions are incorporated into the actual processor design. The processor 1010 may essentially be a completely self-contained computing system, containing multiple cores or processors, a bus, memory controller, cache, etc. A multi-core processor may be symmetric or asymmetric.

To enable user interaction with the computing system 1000, an input device 1045 can represent any number of input mechanisms, such as a microphone for speech, a touch-protected screen for gesture or graphical input, keyboard, mouse, motion input, speech and so forth. An output device 1035 can also be one or more of a number of output mechanisms known to those of skill in the art. In some instances, multimodal systems can enable a user to provide multiple types of input to communicate with the computing system 1000. The communications interface 1040 can govern and manage the user input and system output. There may be no restriction on operating on any particular hardware arrangement and therefore the basic features here may easily be substituted for improved hardware or firmware arrangements as they are developed.

The storage device 1030 can be a non-volatile memory and can be a hard disk or other types of computer readable media which can store data that are accessible by a computer, such as magnetic cassettes, flash memory cards, solid state memory devices, digital versatile disks, cartridges, random access memory, read only memory, and hybrids thereof.

As discussed above, the storage device 1030 can include the software services 1032 for controlling the processor 1010. Other hardware or software modules are contemplated. The storage device 1030 can be connected to the system bus 1005. In some embodiments, a hardware module that performs a particular function can include a software component stored in a computer-readable medium in connection with the necessary hardware components, such as the processor 1010, bus 1005, output device 1035, and so forth, to carry out the function. In a further aspect, the memory 1015 and/or the storage device 1030 can also include network connection processes/services (abbreviated as NC P/S) 1016 that includes instructions, which, when executed by the processor 1010, cause the processor 1010 to implement various functionalities discussed above and shown in FIGS. 7-9E, including aspects of process 900.

For clarity of explanation, in some instances the various embodiments may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program, or a collection of programs that carry out a specific function. In some embodiments, a service can be considered a server. The memory can be a non-transitory computer-readable medium.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, solid state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

What is claimed is:

1. A system, comprising:
a network device including a processor in communication with a memory, the memory including instructions executable by the processor to:
    establish a single namespace within a Network Stack Instance of the network device;
    associate a first socket interface and a first network segment for a first application with a first table identifier, wherein the first table identifier is an identifier to an entry in a table stored in the single namespace;
    establish the first socket interface associated with the single namespace for the first application, the first socket interface having the first table identifier that correlates the first application with the first network segment, and the first socket interface establishing a first connection between the Network Stack Instance and a Forwarding Plane of the network device;
    associate a second socket interface and a second network segment for a second application with a second table identifier, wherein the second table identifier is an identifier to an entry in the table stored in the single namespace; and
    establish the second socket interface associated with the single namespace for the second application, the second socket interface having the second table identifier that correlates the second application with the second network segment, and the second socket interface establishing a second connection between the Network Stack Instance and the Forwarding Plane of the network device.

2. The system of claim 1, the memory further including instructions executable by the processor to:
    receive a first outgoing packet from the first application at the Network Stack Instance, the first outgoing packet designating the first socket interface;
    append the first table identifier to the first outgoing packet; and
    send the first outgoing packet to the Forwarding Plane through the first socket interface.

3. The system of claim 2, the memory further including instructions executable by the processor to:
    access, at the Forwarding Plane, the first table identifier of the first outgoing packet;
    identify the first network segment based on the first table identifier of the first outgoing packet; and
    forward the first outgoing packet to a destination device over the first network segment.

4. The system of claim 1, the memory further including instructions executable by the processor to:
    receive a first incoming packet at the Forwarding Plane destined for the first application, the first incoming packet designating the first application;
    identify the first socket interface based on the first table identifier associated with the first application; and
    send the first incoming packet to the first application through the first socket interface of the Network Stack Instance.

5. The system of claim 4, the memory further including instructions executable by the processor to:
    identify, at the Forwarding Plane, the first network segment of the first incoming packet; and
    identify the first table identifier of the first incoming packet based on the first network segment.

6. The system of claim 4, the memory further including instructions executable by the processor to:
    identify the first table identifier of the first incoming packet; and
    identify the first application based on the first table identifier of the first incoming packet.

7. The system of claim 1, the memory further including instructions executable by the processor to:
    record, at a table stored at the Forwarding Plane, association of the first table identifier and the first network segment with the first socket interface of the Network Stack Instance for the first application.

8. The system of claim 1, the memory further including instructions executable by the processor to:
    intercept a first socket call from the first application, the first socket call including a request for a socket interface in a requested namespace; and
    determine, based on the requested namespace, the first table identifier to be associated with the first socket interface and the first network segment for the first application.

9. The system of claim 1, the memory further including instructions executable by the processor to:
    receive an API call from the first application requesting the first table identifier be associated with the first socket interface and the first network segment for the first application.

10. A method, comprising:
establishing a single namespace within a Network Stack Instance of a network device;
associating a first socket interface and a first network segment for a first application with a first table identifier, wherein the first table identifier is an identifier to an entry in a table stored in the single namespace;
establishing the first socket interface associated with the single namespace for the first application, the first socket interface having the first table identifier that correlates the first application with the first network segment, and the first socket interface establishing a first connection between the Network Stack Instance and a Forwarding Plane of the network device;
associating a second socket interface and a second network segment for a second application with a second table identifier, wherein the second table identifier is an identifier to an entry in the table stored in the single namespace; and establishing the second socket interface associated with the single namespace for the second application, the second socket interface having the second table identifier that correlates the second application with the second network segment, and the second socket interface establishing a second connection between the Network Stack Instance and the Forwarding Plane of the network device.

11. The method of claim 10, further comprising:

receiving a first outgoing packet from the first application at the Network Stack Instance, the first outgoing packet designating the first socket interface;

appending the first table identifier to the first outgoing packet; and sending the first outgoing packet to the Forwarding Plane through the first socket interface.

12. The method of claim 11, further comprising:

accessing, at the Forwarding Plane, the first table identifier of the first outgoing packet;

identifying the first network segment based on the first table identifier of the first outgoing packet; and forwarding the first outgoing packet to a destination device over the first network segment.

13. The method of claim 10, further comprising:

receiving a first incoming packet at the Forwarding Plane destined for the first application, the first incoming packet designating the first application;

identifying the first socket interface based on the first table identifier associated with the first application; and sending the first incoming packet to the first application through the first socket interface of the Network Stack Instance.

14. The method of claim 13, further comprising:

identifying, at the Forwarding Plane, the first network segment of the first incoming packet; and identifying the first table identifier of the first incoming packet based on the first network segment.

15. The method of claim 13, further comprising:

identifying the first table identifier of the first incoming packet; and identifying the first application based on the first table identifier of the first incoming packet.

16. The method of claim 10, further comprising:

recording, at a table stored at the Forwarding Plane, association of the first table identifier and the first network segment with the first socket interface of the Network Stack Instance for the first application.

17. The method of claim 10, further comprising:

intercepting a first socket call from the first application, the first socket call including a request for a socket interface in a requested namespace; and determining, based on the requested namespace, the first table identifier to be associated with the first socket interface and the first network segment for the first application.

18. The method of claim 10, further comprising:

receiving an API call from the first application requesting the first table identifier be associated with the first socket interface and the first network segment for the first application.

19. One or more non-transitory computer-readable media comprising computer-readable instructions, executable by one or more processors of a network device of a network to perform a method for establishing a socket interface between an application and a network segment at a network stack instance, the method comprising:

establishing a single namespace within a Network Stack Instance of a network device;

associating a first socket interface and a first network segment for a first application with a first table identifier, wherein the first table identifier is an identifier to an entry in a table stored in the single namespace;

establishing the first socket interface associated with the single namespace for the first application, the first socket interface having the first table identifier that correlates the first application with the first network segment, and the first socket interface establishing a first connection between the Network Stack Instance and a Forwarding Plane of the network device;

associating a second socket interface and a second network segment for a second application with a second table identifier, wherein the second table identifier is an identifier to an entry in the table stored in the single namespace; and establishing the second socket interface associated with the single namespace for the second application, the second socket interface having the second table identifier that correlates the second application with the second network segment, and the second socket interface establishing a second connection between the Network Stack Instance and the Forwarding Plane of the network device.

20. The one or more non-transitory computer-readable media of claim 19, the method further comprising:

recording, at a table stored at the Forwarding Plane, association of the first table identifier and the first network segment with the first socket interface of the Network Stack Instance for the first application; and recording, at the table stored at the Forwarding Plane, association of the second table identifier and the second network segment with the second socket interface of the Network Stack Instance for the second application.

* * * * *